United States Patent
Gu et al.

(10) Patent No.: US 12,081,034 B2
(45) Date of Patent: Sep. 3, 2024

(54) WIRELESS CHARGING DEVICE

(71) Applicant: SAMSUNG ELECTRONICS CO., LTD., Suwon-si (KR)

(72) Inventors: Beomwoo Gu, Suwon-si (KR); Sungbum Park, Suwon-si (KR); Jaehyun Park, Suwon-si (KR); Kangho Byun, Suwon-si (KR); Sungku Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 533 days.

(21) Appl. No.: 17/276,743

(22) PCT Filed: Sep. 17, 2019

(86) PCT No.: PCT/KR2019/011977
§ 371 (c)(1),
(2) Date: Mar. 16, 2021

(87) PCT Pub. No.: WO2020/060142
PCT Pub. Date: Mar. 26, 2020

(65) Prior Publication Data
US 2022/0045549 A1    Feb. 10, 2022

(30) Foreign Application Priority Data
Sep. 18, 2018    (KR) .................... 10-2018-0111794

(51) Int. Cl.
*H02J 50/00* (2016.01)
*H01F 38/14* (2006.01)
(Continued)

(52) U.S. Cl.
CPC ............ *H02J 50/005* (2020.01); *H01F 38/14* (2013.01); *H02J 7/0044* (2013.01); *H02J 50/10* (2016.02);
(Continued)

(58) Field of Classification Search
CPC ........ H02J 50/005; H02J 50/10; H02J 50/402; H02J 7/0044; H02J 2310/22; H02J 50/80;
(Continued)

(56) References Cited

U.S. PATENT DOCUMENTS 6,748,297 B2    6/2004   Song et al.
8,552,684 B2 *  10/2013  Tabata .................... H01F 38/14
                                              320/108
(Continued)

FOREIGN PATENT DOCUMENTS

CN     101860085 A  * 10/2010  ............. H02J 50/10
CN     101919011 A  * 12/2010  ............. F21V 23/02
(Continued)

OTHER PUBLICATIONS

Extended European Search report dated May 6, 2021 in EP Application No. 19863297.8.
(Continued)

*Primary Examiner* — Suresh Memula
(74) *Attorney, Agent, or Firm* — Nixon & Vanderhye, P.C.

(57) ABSTRACT

An example wireless charging device includes a wireless charging device body and a wireless power transmitting device disposed on the wireless charging device body. The wireless power transmitting device includes at least one transmitting coil and a transmitting magnetic body configured to surround the at least one transmitting coil and to face a receiving magnetic body provided on a wireless power receiving device of an external electronic device. The inner peripheral surface of the wireless power transmitting device faces the inner surface of the wireless charging device body. The transmitting magnetic body is formed in a ring structure, at least a part of which is open. One surface of the open ring structure is disposed on at least a part of the inner surface of
(Continued)

the wireless charging device body. One surface of the ring structure of the transmitting magnetic body faces the receiving magnetic body.

13 Claims, 15 Drawing Sheets

(51) Int. Cl.
    *H02J 7/00*         (2006.01)
    *H02J 50/10*       (2016.01)
    *H02J 50/40*       (2016.01)
    *H02J 50/80*       (2016.01)
    *H04B 5/26*        (2024.01)
    *H04B 5/79*        (2024.01)

(52) U.S. Cl.
    CPC ............. *H02J 50/402* (2020.01); *H04B 5/26* (2024.01); *H04B 5/79* (2024.01); *H02J 50/80* (2016.02); *H02J 2310/22* (2020.01)

(58) Field of Classification Search
    CPC ..... H01F 38/14; H04B 5/0037; H04B 5/0081; H04B 5/79; H04B 5/26
    USPC ........................................................ 320/108
    See application file for complete search history.

(56) References Cited

U.S. PATENT DOCUMENTS

| | | | | |
|---|---|---|---|---|
| 9,337,675 | B2* | 5/2016 | Jung | H02J 50/402 |
| 9,680,329 | B2* | 6/2017 | Janssen | H01F 38/14 |
| 9,929,602 | B2* | 3/2018 | Miyamoto | H02J 50/12 |
| 9,984,815 | B2* | 5/2018 | Xu | H02J 50/10 |
| 10,186,892 | B2* | 1/2019 | Hosseini | H04W 8/005 |
| 10,250,064 | B2* | 4/2019 | Park | G06F 1/26 |
| 10,288,217 | B2* | 5/2019 | Griggs | B60R 11/02 |
| 10,291,071 | B2* | 5/2019 | Bana | H02J 50/90 |
| 10,404,089 | B2* | 9/2019 | Kasar | H02J 50/10 |
| 10,476,999 | B2* | 11/2019 | Sung | G02B 26/007 |
| 10,713,646 | B1* | 7/2020 | Lee | G06Q 20/204 |
| 10,784,035 | B2* | 9/2020 | Ueda | B60L 53/122 |
| 10,965,162 | B2* | 3/2021 | Pinciuc | H01Q 1/36 |
| 11,201,500 | B2* | 12/2021 | Partovi | H02J 7/00714 |
| 11,270,828 | B2* | 3/2022 | Krammer | H01F 27/02 |
| 11,277,031 | B1* | 3/2022 | Peralta | H02J 50/90 |
| 11,277,034 | B1* | 3/2022 | Peralta | H02J 50/80 |
| 11,277,035 | B1* | 3/2022 | Kasireddy | H02J 50/23 |
| 2011/0050164 | A1* | 3/2011 | Partovi | H02J 50/90 320/108 |
| 2012/0299557 | A1* | 11/2012 | Kwon | H02J 50/80 320/166 |
| 2014/0104898 | A1* | 4/2014 | Yeo | H02J 50/40 363/126 |
| 2014/0239727 | A1 | 8/2014 | Wang | |
| 2015/0295345 | A1 | 10/2015 | Hodnefjell | |
| 2015/0332845 | A1* | 11/2015 | Werner | H01F 27/36 307/104 |
| 2016/0094076 | A1* | 3/2016 | Kasar | H01F 38/14 320/103 |
| 2016/0181013 | A1 | 6/2016 | Herrmann | |
| 2016/0181821 | A1 | 6/2016 | Xu et al. | |
| 2016/0204641 | A1* | 7/2016 | Woo | H02J 7/00 320/108 |
| 2017/0170677 | A1* | 6/2017 | Park | G06F 1/1635 |
| 2017/0287626 | A1 | 10/2017 | Larson et al. | |
| 2018/0109292 | A1 | 4/2018 | Lee et al. | |
| 2018/0115168 | A1 | 4/2018 | Schatz et al. | |
| 2018/0131233 | A1 | 5/2018 | Kurs et al. | |
| 2018/0204674 | A1 | 7/2018 | Cho et al. | |
| 2018/0219425 | A1 | 8/2018 | Choi et al. | |
| 2018/0248406 | A1 | 8/2018 | Bae et al. | |
| 2019/0027954 | A1 | 1/2019 | Lee et al. | |
| 2020/0020478 | A1* | 1/2020 | Nishimura | H01F 27/22 |
| 2020/0021138 | A1* | 1/2020 | Yeo | H02J 50/12 |
| 2020/0051737 | A1* | 2/2020 | Han | H01F 27/36 |
| 2022/0247235 | A1* | 8/2022 | Peralta | H02J 50/80 |
| 2022/0247236 | A1* | 8/2022 | Peralta | H02J 50/12 |
| 2022/0247237 | A1* | 8/2022 | Peralta | H04B 5/79 |

FOREIGN PATENT DOCUMENTS

| | | | | |
|---|---|---|---|---|
| CN | 102360870 | | 2/2012 | |
| CN | 105529836 | | 4/2016 | |
| CN | 106463245 | A * | 2/2017 | ............. B60L 5/005 |
| CN | 106601455 | A * | 4/2017 | |
| CN | 106816967 | A * | 6/2017 | |
| CN | 107210625 | A * | 9/2017 | ............. H01F 27/24 |
| CN | 108199496 | | 6/2018 | |
| CN | 108346507 | A * | 7/2018 | ........... B29B 13/022 |
| CN | 108377037 | | 8/2018 | |
| EP | 2066001 | A2 * | 6/2009 | ............... H02J 3/18 |
| EP | 2720341 | A2 * | 4/2014 | ............. G05F 1/575 |
| EP | 2887365 | A1 * | 6/2015 | ............. H01F 27/02 |
| EP | 3336617 | A1 * | 6/2018 | ............. G04G 19/00 |
| JP | H07-106170 | | 4/1995 | |
| JP | 2017-204554 | | 11/2017 | |
| KR | 10-2009-0106965 | | 10/2009 | |
| KR | 10-2017-0027624 | | 3/2017 | |
| KR | 10-2017-0085900 | | 7/2017 | |
| KR | 10-2018-0083773 | | 7/2018 | |
| KR | 10-2018-0101677 | | 9/2018 | |
| WO | WO-2010127389 | A1 * | 11/2010 | ......... G07C 9/00015 |
| WO | WO-2013124359 | A2 * | 8/2013 | ............. H01F 27/24 |
| WO | WO-2014087888 | A1 * | 6/2014 | ........... H01F 27/255 |
| WO | 2017/002014 | | 1/2017 | |
| WO | WO-2017039191 | A1 * | 3/2017 | ............. G04G 19/00 |
| WO | WO-2017148087 | A1 * | 9/2017 | |

OTHER PUBLICATIONS

International Search Report for PCT/KR2019/011977 dated Dec. 20, 2019, 5 pages.
Written Opinion of the ISA for PCT/KR2019/011977 dated Dec. 20, 2019, 5 pages.
Office Action dated Jan. 11, 2004 in Chinese Application No. 201980057555.0 and English-language translation.
Notice of Allowance dated Jun. 3, 2024 in Chinese Application No. 201980057555.0 and English-language translation.

* cited by examiner

WIRELESS CHARGING DEVICE

CROSS-REFERENCE TO RELATED APPLICATIONS

This application is a National Phase Entry of PCT international Application No. PCT/KR2019/011977, which was filed on Sep. 17, 2019, and claims priority to Korean Patent Application No. 10-2018-0111794 filed on Sep. 18, 2018, in the Korean Intellectual Property Office, the contents of which are incorporated herein by reference.

BACKGROUND

Field

The disclosure relates to a wireless charging device.

Description of Related Art

As information communication technologies recently have rapidly developed, societies have become based on the information communication technologies more and more. Further, in such information-based societies, in order to connect and operate information communication devices regardless of time and place, the importance of sensors embedded in the electronic devices and power supply problems become gradually spotlighted.

In general, the operation of charging a battery of a mobile device requires time and effort, and as the kinds of the mobile devices such as mobile phones become diversified, interest has increased in wireless power transmission technology as a method for solving power supply problems. For example, a wireless power receiving device, such as a mobile device that wirelessly receives energy may be driven by wireless power received or may be driven by electric power that is charged after a battery is charged by using the wireless power received.

Such a wireless charging technology employs wireless power transmission/reception, and, for example, corresponds to a system in which a battery can be automatically charged when a mobile device is not connected to a separate charging connector, but simply placed on a charging pad. The wireless charging technology can increase the mobility of the electronic device because a wired charger is not necessary as the electronic product is charged wirelessly. The wireless charging technology includes an electromagnetic induction scheme using a coil. The power transmission method using the electromagnetic induction scheme is a method of transmitting electric power between a primary coil and a secondary coil. If a current is applied to a coil, a transmission part generates an electric field, and electric power is induced to produce energy according to the electromagnetic field generated by the transmission part. The phenomenon is called a magnetic induction phenomenon.

SUMMARY

The wireless power transmitting device in the electromagnetic induction scheme includes a coil of a transmission part and a coil of a reception part, and has a structure in which the coil of the transmission part and the coil of the reception part are wound on a plane while the radii of winding thereof are increased because it is more advantageous in wireless power transmission as the areas of the facing surfaces of the coil of the transmission part and the coil of the reception part become larger. For example, the shapes of the coil of the transmission part and the coil of the reception part may include a disk shape, a spiral shape, a loop shape, and a plate shape. The coil of the transmission part is embedded in a charging pad and the coil of the reception part is embedded in a mobile device. Then, although the coil of the transmission part and the coil of the reception part may face each other while being close to each other to smoothly perform charging when the charging pad and the mobile device have rectangular shapes, the coil of the transmission part may have a predetermined distance from the outskirt of the charging pad and similarly, the coil of the reception part also may have a predetermined distance from the outskirt of the curved mobile device when the charging pad and the mobile device have curved shapes. For example, when the coils on the horizontal plate are installed on the curved surface of the mobile device, a distance may be provided between the horizontal surface and the curved surface. Accordingly, when the coil of the transmission part and the coil of the reception part face each other for charging, the facing distance between the coil of the transmission part and the coil of the reception part becomes larger, and accordingly, the wireless power transmission efficiency of the transmission part and the reception part deteriorates. Accordingly, a structure for increasing the wireless power transmission efficiency of the transmission part and the reception part may be necessary.

According to various embodiments of the disclosure, as the wireless power transmitting device and the wireless power receiving device embedded in the electronic device are arranged along the external shape of the electronic device to face each other, the facing distance between the transmission device and the reception device can be reduced.

Meanwhile, the technical tasks that are to be accomplished by various embodiments of the disclosure are not limited to the aforementioned ones, and other technical tasks may be present.

According to various embodiments of the disclosure, a wireless charging device includes a wireless power transmitting device embedded in a wireless charging device body and arranged to face a wireless power receiving device provided in an external electronic device, the wireless power transmitting device including at least one transmission coil, and a transmission magnetic body surrounding the at least one transmission coil and facing a reception magnetic body provided in the wireless power receiving device, wherein the wireless power transmitting device has a ring shape, wherein the outer circumferential surface of the ring shape of the wireless power receiving device faces the inner surface of the external electronic device, wherein the inner circumferential surface of the ring shape of the wireless power transmitting device faces the inner surface of the wireless charging device body, wherein when the wireless charging device body and the external electronic device are coupled to each other, the outer circumferential surface of the ring shape of the wireless power receiving device and the inner circumferential surface of the ring shape of the wireless power transmitting device face each other, wherein the reception magnetic body and the transmission magnetic body have ring structures, at least a portion of which is opened, when viewed in a side section cut vertically, wherein one surface of the opened ring structure of the reception magnetic body is arranged at at least a portion of the inner external shape of the external electronic device, wherein one surface of the opened ring structure of the transmission magnetic body is arranged at at least a portion of the inner external shape of the wireless charging device body, and wherein the transmission magnetic body generates at least one electric field such that electric power is induced in the at least one reception coil provided in the wireless power receiving device when a current is applied to the at least one transmission coil in a state in which one surface of the opened ring structure of the reception magnetic body and one surface of the opened ring structure of the transmission magnetic body face each other.

According to various embodiments of the disclosure, a wireless charging device includes a wireless power transmitting device embedded in a wireless charging device body and arranged to face a wireless power receiving device provided in an external electronic device, the wireless power transmitting device including at least one transmission coil, and a transmission magnetic body surrounding the at least one transmission coil and facing a reception magnetic body provided in the wireless power receiving device, wherein the transmission magnetic body generates at least one electric field such that electric power is induced in the at least one reception coil provided in the wireless power receiving device when a current is applied to the at least one transmission coil in a state.

According to various embodiments of the disclosure, an electronic device includes a wireless power receiving device embedded in an external electronic device and arranged to face a wireless power transmitting device provided in a wireless charging device body, the wireless power receiving device including at least one reception coil, and a reception magnetic body surrounding the at least one reception coil and facing a transmission magnetic body provided in the wireless power transmitting device, wherein the wireless power receiving device has a ring shape, wherein the outer circumferential surface of the ring shape of the wireless power receiving device faces the inner surface of the external electronic device, wherein the inner circumferential surface of the ring shape of the wireless power transmitting device faces the inner surface of the wireless charging device body, wherein when the external electronic device and the wireless charging device body are coupled to each other, the outer circumferential surface of the ring shape of the wireless power receiving device and the inner circumferential surface of the ring shape of the wireless power transmitting device face each other, wherein the reception magnetic body has a ring structure, at least a portion of which is opened, when viewed in a side section cut vertically, and wherein one surface of the opened ring structure of the reception magnetic body is arranged at at least a portion of the inner external shape of the external electronic device.

According to various embodiments of the disclosure, the distance between the reception magnetic body and the transmission magnetic body can be reduced as the wireless charging device constitutes the wireless power transmitting device arranged to face the wireless power receiving device and the reception magnetic body with a ring structure of the wireless power receiving device and the transmission magnetic body with a ring structure of the wireless power transmitting device, and accordingly, the transmission magnetic body can easily generate at least one electromagnetic field such that electric power is induced in the at least one reception coil when a current is applied to the at least one transmission coil, and the electric power induced by the generated at least one electromagnetic field can be maximized. Accordingly, the wireless power transmission efficiency of the product can be enhanced. Accordingly, stable electric power can be induced and supplied to the at least one reception coil.

By forming an electromagnetic field only in the transmission magnetic body of the ring structure and the reception magnetic body of the ring structure, an electromagnetic interference (EMI) that may be generated by the outside of the at least one transmission coil and the at least one reception coil can be reduced.

Because the wireless power receiving device and the wireless power transmitting device have ring shapes, the inner empty spaces of the wireless power receiving device and the wireless power transmitting device can be utilized. Accordingly, the degree of freedom of arrangement of components and the spatial utility of the interior of the product can be enhanced.

BRIEF DESCRIPTION OF THE DRAWINGS

FIG. 15 is a block diagram illustrating a wireless charging device according to various embodiments of the disclosure; and.

DETAILED DESCRIPTION

Figure 1:
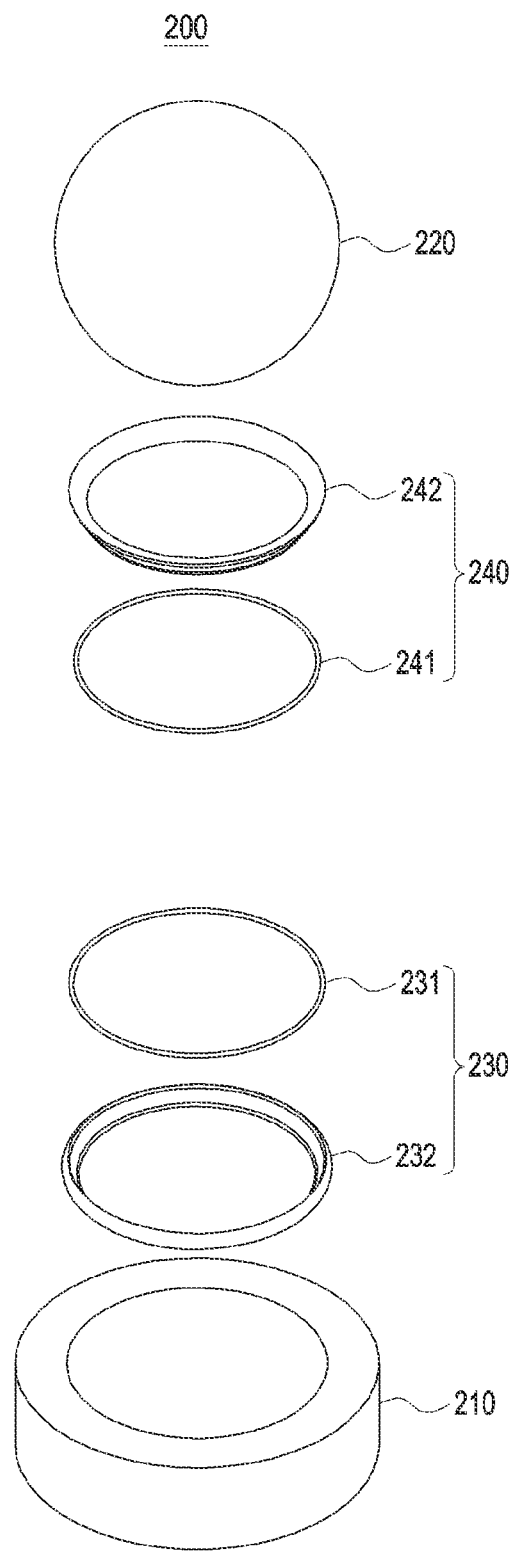
FIG. 1 is an exploded perspective view illustrating a configuration of a wireless charging device according to various embodiments of the disclosure.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with," it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
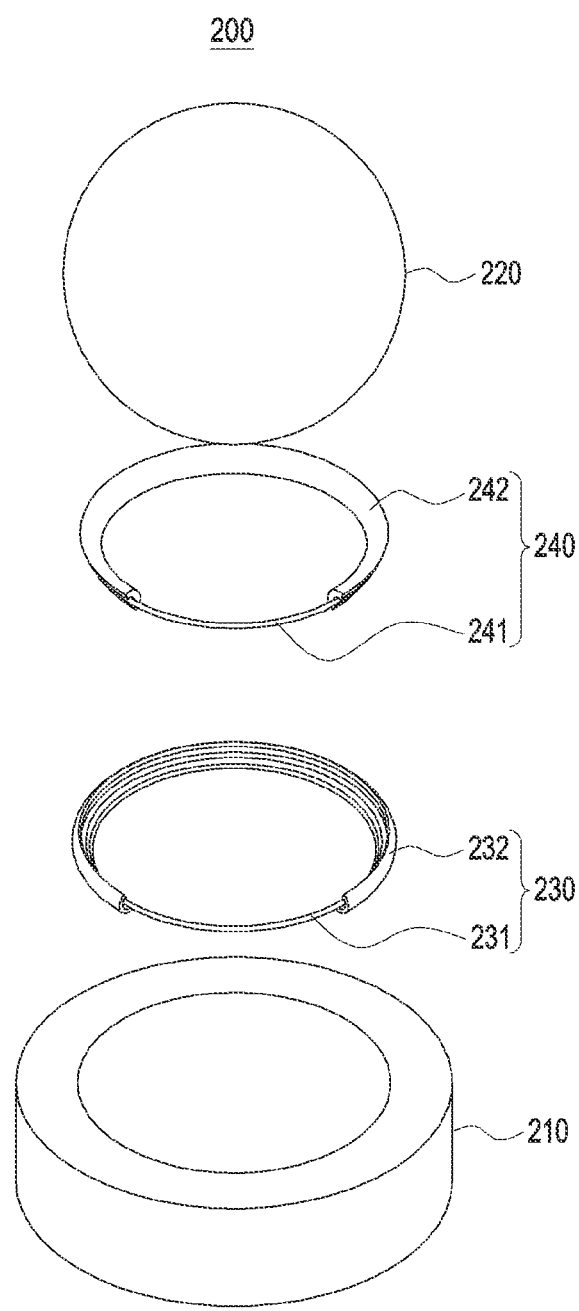
FIG. 2 is an exploded perspective view of the configuration of the wireless charging device in a state before a wireless power receiving device and a wireless power transmitting device are coupled to each other according to various embodiments of the disclosure.
Figure 3:
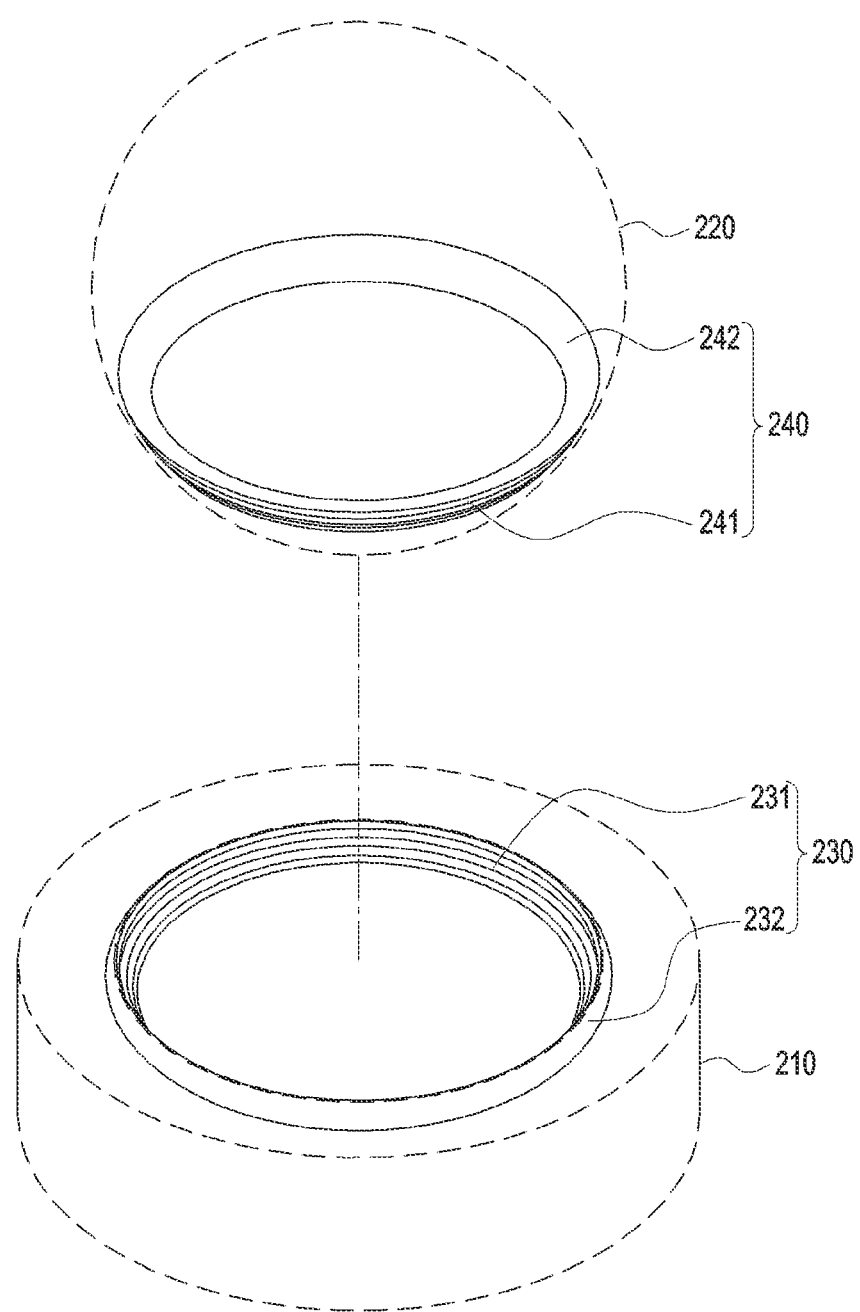
FIG. 3 is a perspective view illustrating the wireless power receiving device coupled to an external electronic device and the wireless power transmitting device coupled to the wireless charging device, in the configuration of the wireless charging device according to various embodiments of the disclosure.
Figure 4:
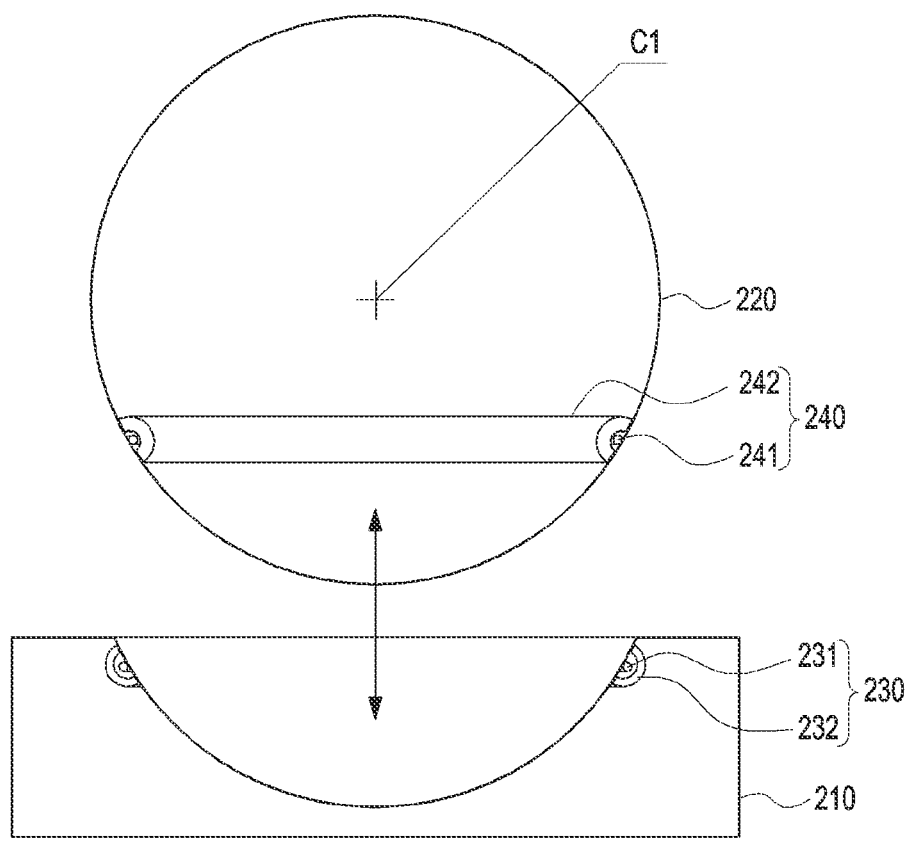
FIG. 4 is a side sectional view illustrating the wireless power receiving device coupled to an external electronic device and the wireless power transmitting device coupled to the wireless charging device, in the configuration of the wireless charging device according to various embodiments of the disclosure.

FIG. 1 is an exploded perspective view illustrating a configuration of a wireless charging device 200 according to various embodiments of the disclosure. FIG. 2 is an exploded perspective view of the configuration of the wireless charging device in a state before a wireless power receiving device 240 and a wireless power transmitting device 230 are coupled to each other according to various embodiments of the disclosure. FIG. 3 is a perspective view illustrating the wireless power receiving device 240 coupled to an external electronic device 220 and the wireless power transmitting device 230 coupled to the wireless charging device body 210, in the configuration of the wireless charging device according to various embodiments of the disclosure. FIG. 4 is a side sectional view illustrating the wireless power receiving device 240 coupled to the external electronic device 220 and the wireless power transmitting device 230 coupled to the wireless charging device body 210, in the configuration of the wireless charging device according to various embodiments of the disclosure.

Referring to FIGS. 1 to 4, the wireless charging device 200 according to various embodiments may include a wireless charging device body 210 and a wireless power transmitting device 230. For example, the external electronic device 220 may include at least one of a robot device, a robot cleaner, an artificial intelligence (AI) robot, a wearable device, a speaker device, an artificial intelligence (AI) electronic device, a portable communication device, or a smartphone. The external electronic device 220 may be variously applied to any electronic device that faces the wireless charging device body 210 for charging, in addition to the disclosed electronic device. In the embodiment, the external electronic device 220, to which a spherical robot device is applied, will be described. The wireless charging device may include at least one of a station or a charging pad. Similarly, the wireless charging device may be variously applied to any electronic device that may charge the electronic device 220, in addition to the disclosed electronic device. In the embodiment, the wireless charging device, to which a station is applied, will be described. In addition, the electronic device (e.g., the electronic device 301 of FIG. 16), which will be described below, will be described in detail as the external electronic device 220.

The wireless power receiving device 240 may be embedded in the external electronic device 220, and may include at least one reception coil 241 and a reception magnetic body 242 that surrounds the at least one reception coil 241. The reception magnetic body 242 may face a transmission magnetic body 232, which will be described below.

The wireless power transmitting device 230 may be embedded in the wireless charging device body 210, may be disposed to face the wireless power receiving device 240, and may include at least one transmission coil 231 and a transmission magnetic body 232 that surrounds the at least one transmission coil 231. The transmission magnetic body 232 may face the reception magnetic body 242.

The wireless power receiving device 240 and the wireless power transmitting device 230 may be formed in ring shapes. Similarly, the at least one reception coil 241 and the reception magnetic body 242 also may be formed in ring shapes, and the at least one transmission coil 231 and the transmission magnetic body 232 also may be formed in ring shapes.

According to an embodiment, the wireless power receiving device 240 and the wireless power transmitting device 230 may be formed in polygonal shapes, in addition to the ring shapes. For example, the shapes of the wireless power receiving device 240 and the wireless power transmitting device 230 may include at least one of a triangular shape, a tetragonal shape, a pentagonal shape, and a hexagonal shape. In addition, the at least one reception coil 241 and the reception magnetic body 242 also may have polygonal shapes, in addition to the ring shapes. For example, the at least one reception coil 241 and the reception magnetic body 242 also may include at least one of a triangular shape, a tetragonal shape, a pentagonal shape, and a hexagonal shape. In addition, the at least one transmission coil 231 and the transmission magnetic body 232 also may have polygonal shapes, in addition to the ring shapes. For example, the at least one transmission coil 231 and the transmission magnetic body 232 also may include at least one of a triangular shape, a tetragonal shape, a pentagonal shape, and a hexagonal shape.

According to an embodiment, when the wireless power receiving device 240 is embedded in the external electronic device 220, the outer circumferential surface of the ring shape of the wireless power receiving device 240 may face the inner surface of the external electronic device 220.

According to an embodiment, when the wireless power transmitting device 230 is embedded in the wireless charging device body 210, the inner circumferential surface of the ring shape of the wireless power transmitting device 230 may face the inner surface of the wireless charging device body 210.

When the external electronic device 220 and the wireless charging device body 210 are coupled to each other, the outer circumferential surface of the ring shape of the wireless power receiving device 240 and the inner circumferential surface of the ring shape of the wireless power transmitting device 230 may face each other. Also, the at least one reception coil 241 and the reception magnetic body 242 in ring shapes may face the at least one transmission coil 231 and the transmission magnetic body 232 in ring shapes.

Accordingly, because the wireless power receiving device 240 and the wireless power transmitting device 230 are formed in ring shapes, the interior empty spaces of the wireless power receiving device 240 and the wireless power transmitting device 230 may be utilized. For example, various components may be freely disposed in the empty space, and accordingly, the degree of freedom of arrangement of the component in the interior of the product can be improved, and the space utility of the product can be improved.

Accordingly, as illustrated in FIG. 4, the wireless power receiving device 240 may be disposed between the outer circumferential surface and the central axis C1 of the external electronic device 220.

According to another embodiment for arrangement of the wireless power receiving device 240 and the wireless power transmitting device 230, the wireless power receiving device 240 and the wireless power transmitting device 230 may be disposed parallel to or perpendicular to the central axis C1 of the external electronic device 220. Accordingly, the wireless power receiving device 240 and the wireless power transmitting device 230 may be freely arranged in the product.

Figure 5:
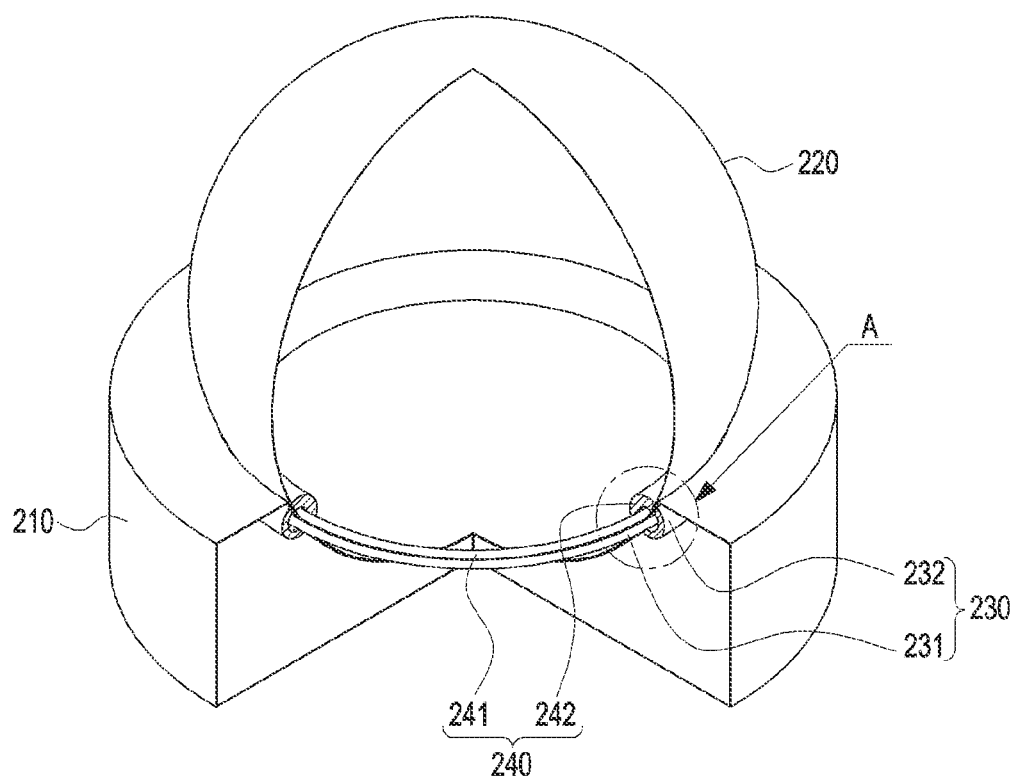
FIG. 5 is a partially cutaway perspective view illustrating a state in which the wireless power receiving device coupled to the external electronic device and the wireless power transmitting device coupled to the wireless charging device face each other, in the configuration of the wireless charging device according to various embodiments of the disclosure.
Figure 6:
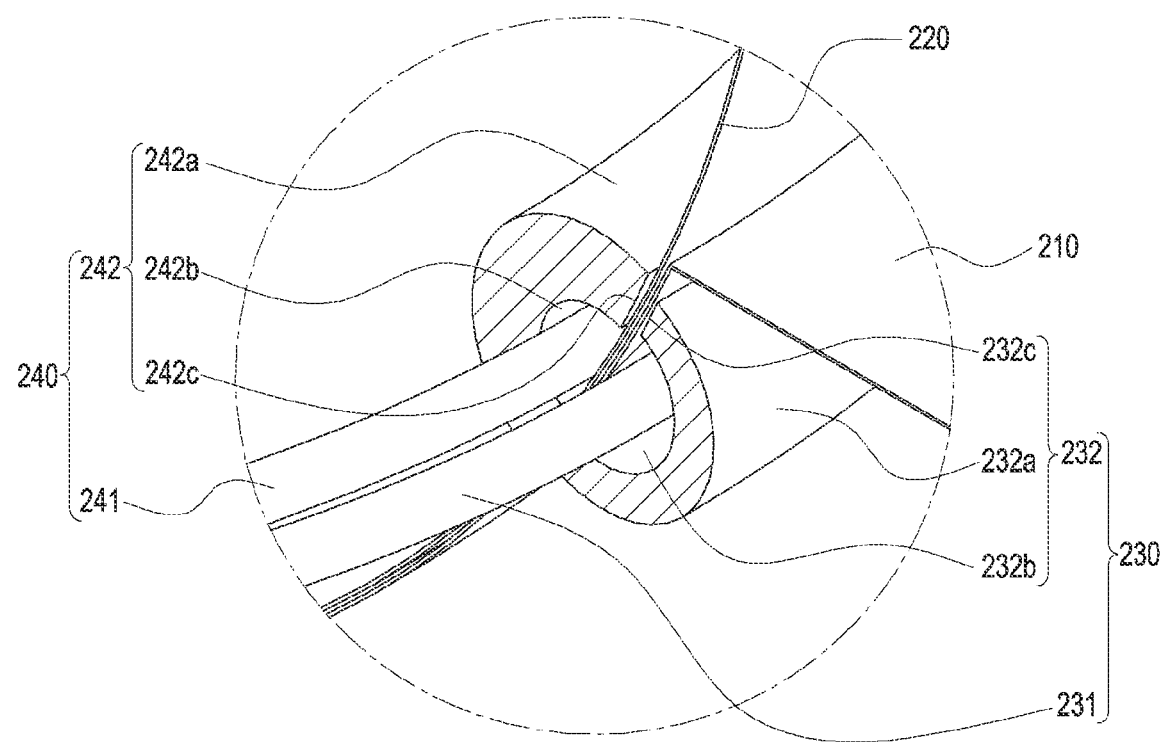
FIG. 6 is a partially cutaway enlarged perspective view of portion A of FIG. 5.
Figure 7:
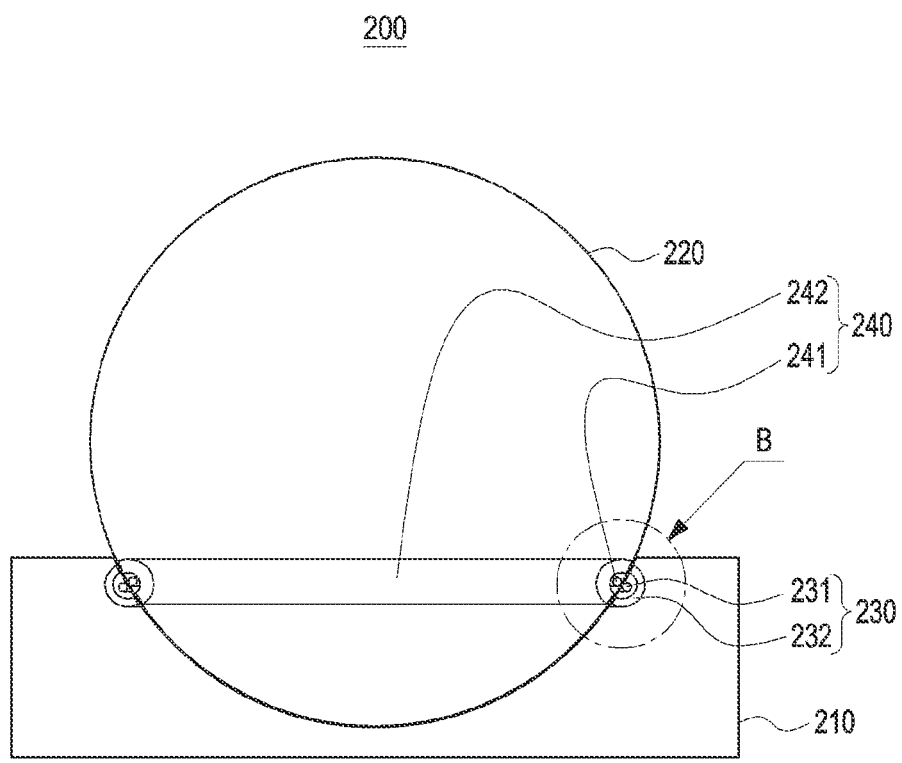
FIG. 7 is a side sectional view illustrating a state in which the wireless power receiving device coupled to the external electronic device and the wireless power transmitting device coupled to the wireless charging device face each other, in the configuration of the wireless charging device according to various embodiments of the disclosure.
Figure 8:
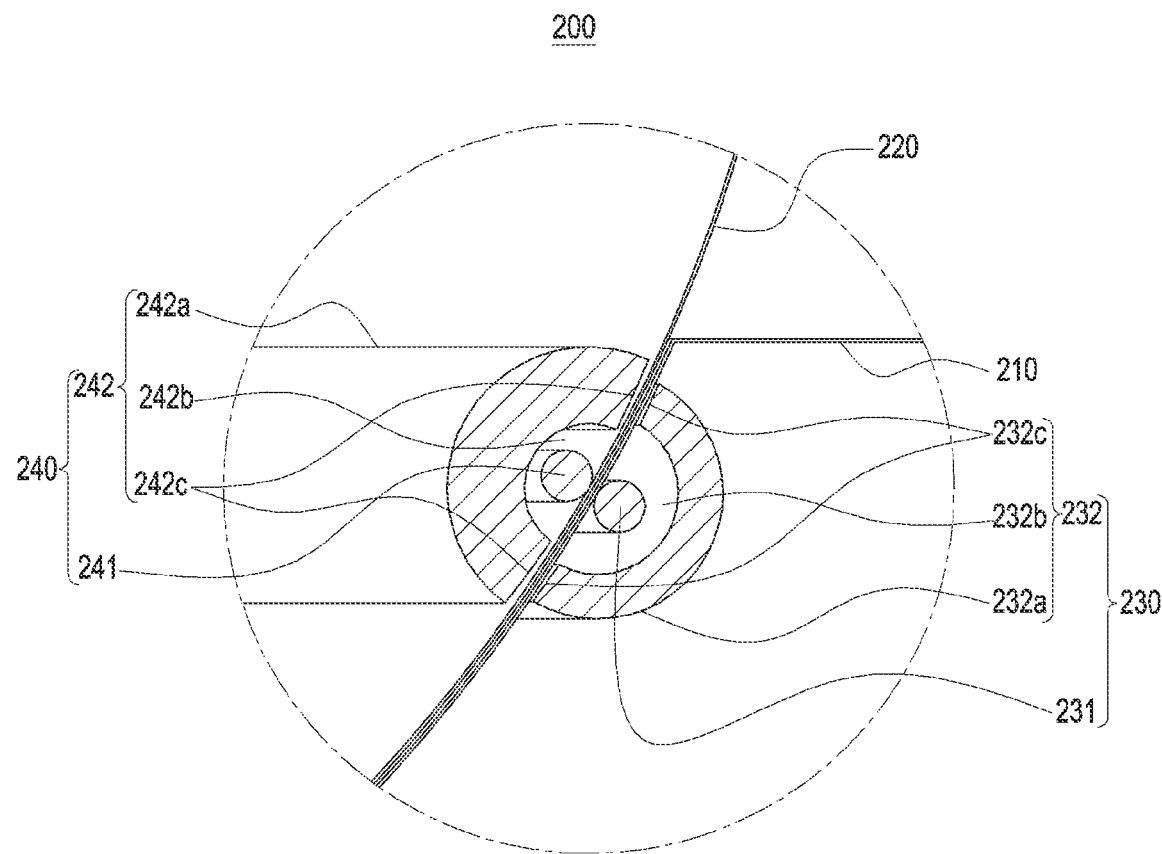
FIG. 8 is an enlarged side sectional view of portion B of FIG. 7.

FIG. 5 is an at least partially cutaway perspective view illustrating a state in which the wireless power receiving device 240 coupled to the external electronic device 220 and the wireless power transmitting device 230 coupled to the wireless charging device body 210 face each other, in the configuration of the wireless charging device 200 according to various embodiments of the disclosure. FIG. 6 is a partially cutaway enlarged perspective view of portion A of FIG. 5. FIG. 7 is a side sectional view illustrating a state in which the wireless power receiving device 240 coupled to the external electronic device 220 and the wireless power transmitting device 230 coupled to the wireless charging device body 210 face each other, in the configuration of the wireless charging device 200 according to various embodiments of the disclosure. FIG. 8 is an enlarged side sectional view of portion B of FIG. 7.

Referring to FIGS. 5 to 8, when the reception magnetic body 242 and the transmission magnetic body 232 are viewed in a side sectional view that is cut in a vertical direction, the reception magnetic body 242 and the transmission magnetic body 232 may have a ring structure, at least a portion of which is opened. For example, in the structure, one side of the ring structure of the reception magnetic body 242 may be opened and an opposite side of the reception magnetic body 242 may be closed. Similarly, in the structure, one side of the ring structure of the transmission magnetic body 232 may be opened and an opposite side of the transmission magnetic body 232 may be closed.

In this state, one surface (e.g., a reception surface 242c) of the opened ring structure of the reception magnetic body 242 may be arranged at at least a portion of the inner external shape surface of the external electronic device 220, and one surface (e.g., a transmission surface 232c) of the opened ring structure of the transmission magnetic body 232 may be arranged at at least a portion of the inner external shape surface of the wireless charging device body 210. For example, the external electronic device 220 may include a spherical robot device, and one surface (e.g., a reception surface 242c) of the opened ring structure of the reception magnetic body 242 may face a curved surface disposed in the spherical robot device. Similarly, one surface (e.g., the transmission surface 232c) of the opened ring structure of the transmission magnetic body 232 may face a curved surface disposed in the wireless charging device body 210.

In this state, as illustrated in FIGS. 7 and 8, which have been mentioned above, when a battery embedded in the external electronic device 220 is charged, the first and second electronic devices 220 and 210 may be coupled to each other. For example, the external electronic device 220 is positioned on the upper surface of the wireless charging device body 210 at the same time when it is coupled to the upper surface of the wireless charging device body 210. The wireless power receiving device 240 embedded in the external electronic device 220 and the wireless power transmitting device 230 embedded in the wireless charging device body 210 may face each other. For example, the outer circumferential surface of the ring shape of the wireless power receiving device may face the inner circumferential surface of the ring shape of the wireless power transmitting device.

In this state, as illustrated in FIG. 8 earlier, when the wireless power receiving device 240 and the wireless power transmitting device 230 are cut in a vertical direction and the side section thereof is viewed, one surface (e.g., the reception surface 242c) of the opened ring structure of the reception magnetic body embedded in the external electronic device 220 and one surface (e.g., the transmission surface 232c) of the opened ring shape of the transmission magnetic body embedded in the wireless charging device body 210 may face each other. For example, the reception magnetic body 242 may include a main body 242a having a ring shape, at least a portion of which is opened, a seating space 242b, and a reception surface 242c. The seating space 242b, in which the at least one reception coil 241 is seated while being surrounded by the seating space 242b, may be disposed at a central portion of the main body 242a having a ring shape. The reception surface 242c may include one surface of the opened ring shape. The reception surface 242c may face the transmission surface 232c disposed in the main body 232a. One or a plurality of reception coils 241 may be disposed in the seating space 242b such that a current is stably induced.

According to various embodiments, as illustrated in FIG. 8 again, the transmission magnetic body 232 may include a main body 232a having a ring shape, at least a portion of which is opened, a seating space 232b, and a transmission surface 232c. The seating space 232b, in which the at least one transmission coil 231 is seated while being surrounded by the seating space 232b, may be disposed at a central portion of the main body 232a having a ring shape. The transmission surface 232c may face the reception surface 242c disposed in the main body 242a. One or a plurality of transmission coils 231 may be disposed in the seating space 232b such that a current is stably supplied.

In this way, if the battery embedded in the external electronic device 220 is positioned on the wireless charging device body 210 to be charged, the wireless power receiving device 240 embedded in the external electronic device 220 may face the wireless power transmitting device 230 embedded in the wireless charging device body 210. The reception magnetic body 242 of the wireless power receiving device 240 may face the transmission magnetic body 232 of the wireless power transmitting device 230, and the reception surface 242c of the reception magnetic body 242 may face the transmission surface 232c of the transmission magnetic body 232 to be closest to the transmission surface 232c of the transmission magnetic body 232. A predetermined distance (e.g., an aperture for electromagnetic waves) may be provided between the reception surface 242c and the transmission surface 232c to form an electromagnetic field A1.

Figure 9:
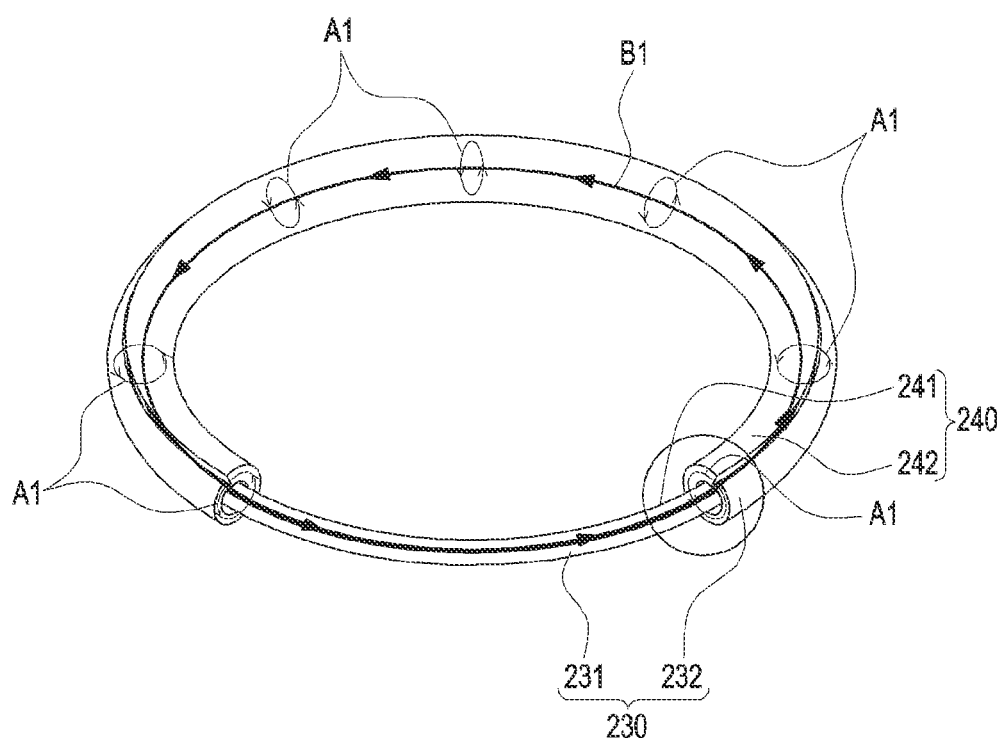
FIG. 9 is a perspective view illustrating operational states of the wireless power receiving device coupled to the external electronic device and the wireless power transmitting device coupled to the wireless charging device, in the configuration of the wireless charging device according to various embodiments of the disclosure.
Figure 10:
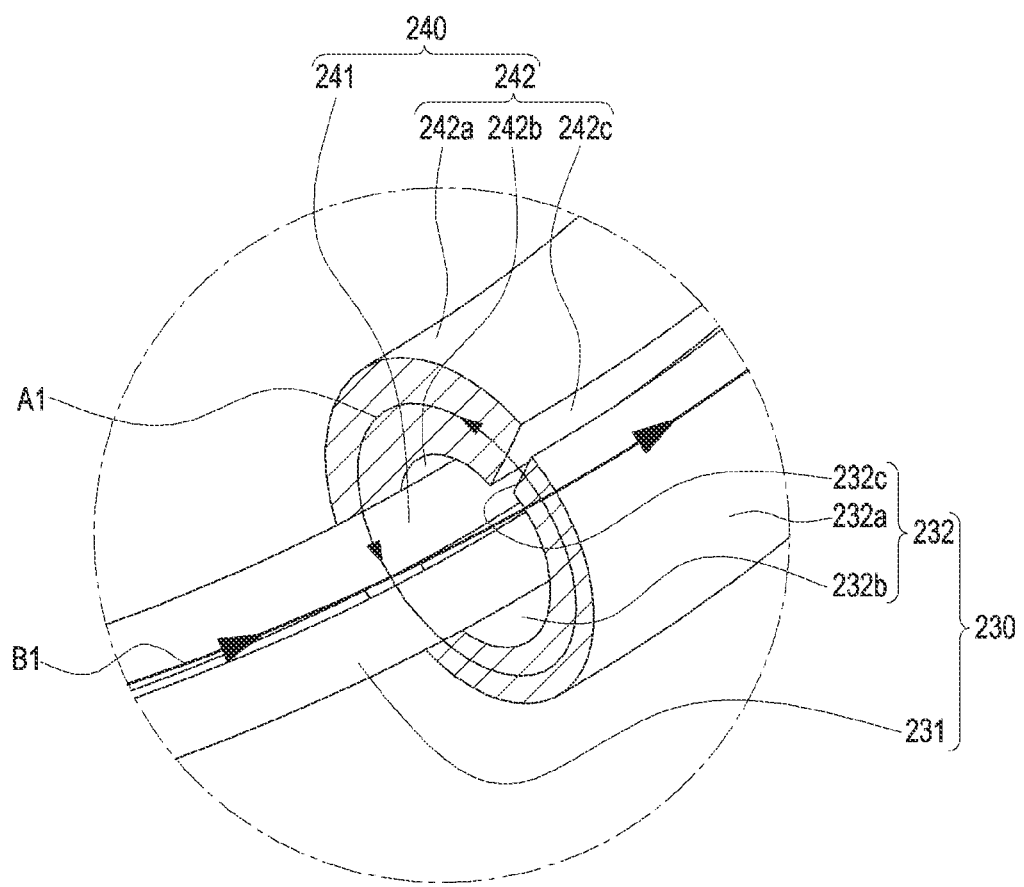
FIG. 10 is an enlarged perspective view of portion C of FIG. 9.
Figure 11:
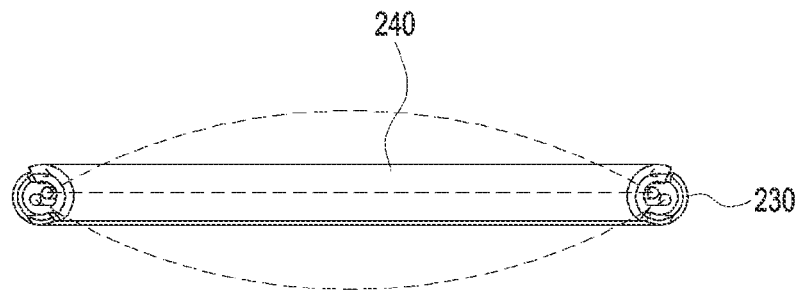
FIG. 11 is a side sectional view illustrating operational states of the wireless power receiving device coupled to the external electronic device and the wireless power transmitting device coupled to the wireless charging device, in the configuration of the wireless charging device according to various embodiments of the disclosure.
Figure 12:
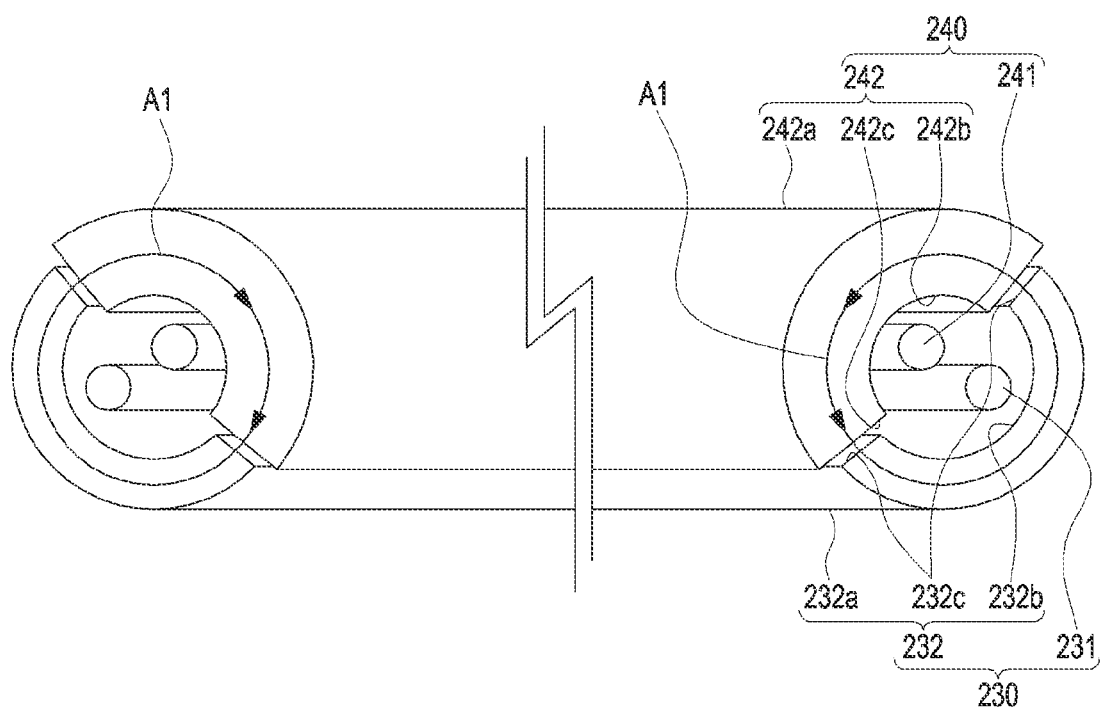
FIG. 12 is an enlarged side sectional view of FIG. 11.

FIG. 9 is a perspective view illustrating an operational state of the wireless power receiving device 240 coupled to an external electronic device 220 and the wireless power transmitting device 230 coupled to the wireless charging device body 210, in the configuration of the wireless charging device according to various embodiments of the disclosure. FIG. 10 is an enlarged perspective view of portion C of FIG. 9. FIG. 11 is a side sectional view illustrating an operational state of the wireless power receiving device 240 coupled to an external electronic device 220 and the wireless power transmitting device 230 coupled to the wireless charging device body 210, in the configuration of the wireless charging device according to various embodiments of the disclosure. FIG. 12 is an enlarged side sectional view of FIG. 11.

As illustrated in FIGS. 9 to 12, if a current is applied to the at least one transmission coil 231 to charge the battery (e.g., the battery 251e of FIG. 15) embedded in the external electronic device 220 in a state in which the reception surface 242c of the reception magnetic body 242, which has an opened ring structure, faces the transmission surface 232c of the transmission magnetic body 232, which has an opened ring structure, a closed current curve B1 may be formed according to the shape of the at least one transmission coil 231. The transmission magnetic body 232 may generate at least one electromagnetic field A1 according to Ampere's Law. For example, the at least one electromagnetic field A1 may have an arc shape according to the ring structure of the reception magnetic body 242 and the ring structure of the transmission magnetic body 232.

The at least one electromagnetic field A1 may induce electric power in the at least one reception coil 241. The electric power induced by the at least one reception coil 241 may be transmitted to the battery (e.g., the battery 251e of FIG. 15) of the external electronic device 220 through the at least one transmission coil 241 and may be charged.

A power transmission circuit (e.g., the power transmission circuit 211 of FIG. 15) provided in the wireless charging device body 210 may provide electric power required by the wireless power receiving device 240, by which electric power is to be received, and may include at least one transmission coil 231 and a transmission magnetic body 232. The power transmission circuit (e.g., the power transmission circuit 211 of FIG. 15) may be configured to wirelessly transmit electric power to the wireless power receiving device 240 through the at least one transmission coil 231. The power transmission circuit (e.g., the power transmission circuit 211 of FIG. 15) may be supplied with a current in DC or AC waveforms from the outside, may generate an electromagnetic field A1 if the supplied current is applied to the at least one transmission coil 231, and the generated electromagnetic field A1 may induce electric power in the at least one reception coil 241 of the wireless power receiving device 240. The power transmission circuit (e.g., the power transmission circuit 211 of FIG. 15) will be described in more detail in the power transmission circuit 211, which will be described below.

According to an embodiment, the power reception circuit (e.g., the power reception circuit 251 of FIG. 15) provided in the external electronic device 220 may receive the induced electric power from the at least one reception coil 241. The electric power received through the at least one reception coil 241 may be charged in the battery (e.g., the battery 251e of FIG. 15) via the power reception circuit (e.g., the power reception circuit 251 of FIG. 15). The power reception circuit (e.g., the power transmission circuit 251 of FIG. 15) will be described in more detail in the power reception circuit 251, which will be described below.

In this way, the distance between the reception magnetic body 242 and the transmission magnetic body 232 can be reduced by causing one surface (e.g., the reception surface 242c) of the opened ring structure of the reception magnetic body 242 and one surface (e.g., the transmission surface 232c) of the opened ring structure of the transmission magnetic body 232 to face each other, and if a current is applied to the at least one transmission coil 231 in this state, the transmission magnetic body 232 can easily generate at least one electromagnetic field A1 such that electric power is induced in the at least one reception coil 241 and the at least one electromagnetic field A1 generated in this way can maximize the induced power. Accordingly, the wireless power transmission efficiency of the product can be enhanced. Also, stable electric power can be induced and supplied to the at least one reception coil 241.

Figure 13A:
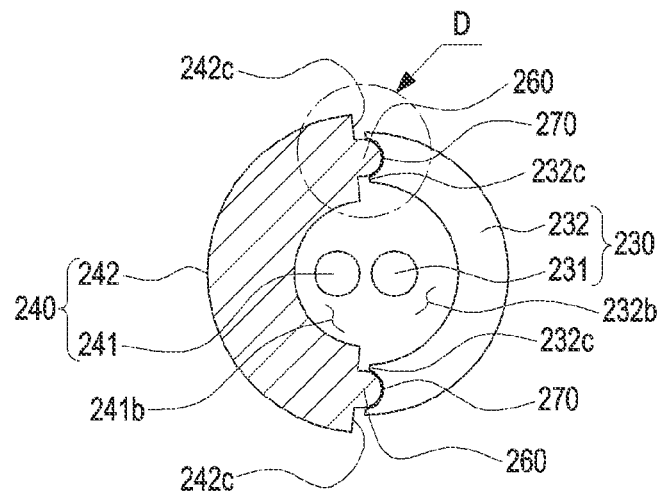
FIG. 13A is a side sectional view illustrating a state in which the wireless power receiving device coupled to the external electronic device and the wireless power transmitting device coupled to the wireless charging device face each other, in the configuration of the wireless charging device according to other various embodiments of the disclosure.
Figure 13B:
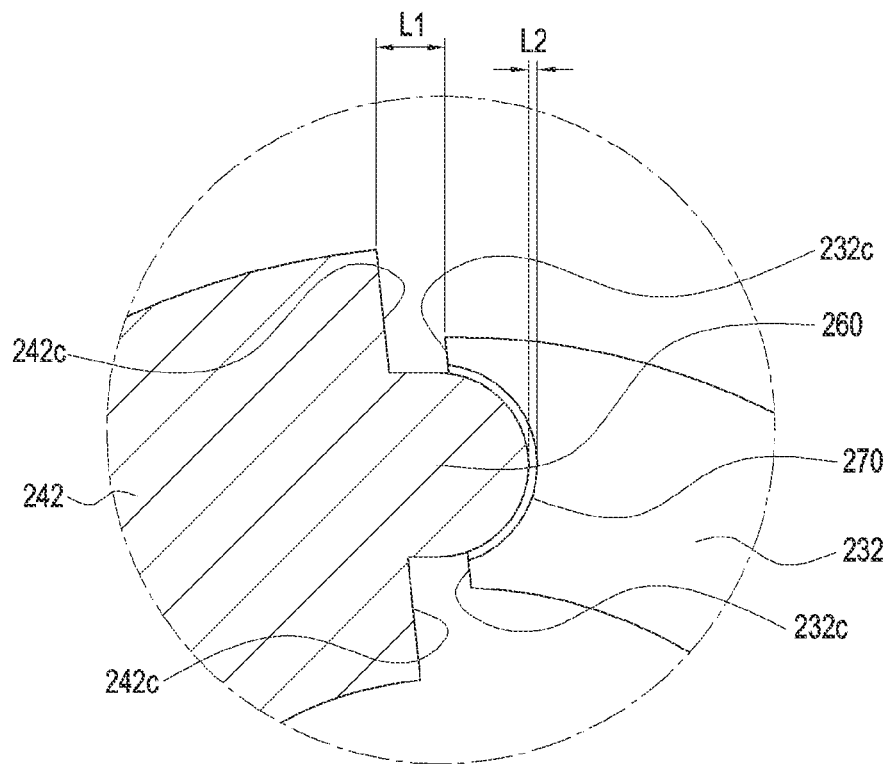
FIG. 13B is an enlarged side sectional view of portion D of FIG. 13A.

FIG. 13A is a side sectional view illustrating a state in which the wireless power receiving device 240 coupled to the external electronic device 220 and the wireless power transmitting device 230 coupled to the wireless charging device body 210 face each other, in the configuration of the wireless charging device 200 according to other various embodiments of the disclosure. FIG. 13B is an enlarged side sectional view of portion D of FIG. 13A.

Referring to FIGS. 13A and 13B, the reception surface 242c disposed in the main body 242a and the transmission surface 232c disposed in the main body 232a may face each other. The reception surface 242c may include a coupling boss 260 coupled to a coupling recess 270 disposed on the transmission surface 232c. For example, when the reception magnetic body 242 and the transmission magnetic body 232 face each other, the reception surface 242c and the transmission surface 232c face each other, and the coupling boss 260 of the reception surface 242c may be inserted into and coupled to the coupling recess of the transmission surface 232c. The interval L2 between the coupling boss 260 and the coupling groove 270 may be disposed to be smaller than the interval L1 between the reception surface 242c and the transmission surface 232c.

Accordingly, because the interval L2 between the coupling boss 260 and the coupling recess 270 is disposed to be smaller than the interval L1 between the reception surface 242c and the transmission surface 232c, the transmission magnetic body 232 can generate at least one electromagnetic field A1 more easily such that an electric field is induced in the at least one reception coil 241 when a current is applied to the at least one transmission coil 231, and the at least one electromagnetic field A1 generated in this way can be further maximized. Accordingly, the wireless power transmission efficiency of the product can be further enhanced. Further, because at least one electromagnetic field is formed only in the transmission magnetic body 232 and the reception magnetic body 242, an electromagnetic interference (EMI) that may be generated by the outside of the at least one transmission coil 231 and the at least one reception coil 241 can be further reduced.

Figure 14A:
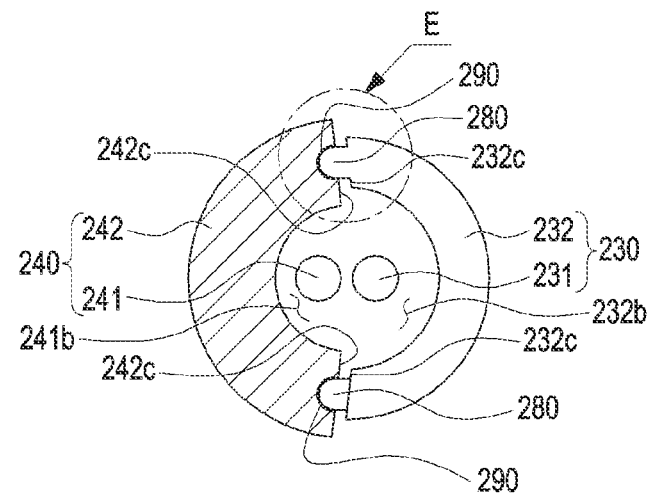
FIG. 14A is a side sectional view illustrating a state in which the wireless power receiving device coupled to the external electronic device and the wireless power transmitting device coupled to the wireless charging device face each other, in the configuration of the wireless charging device according to other various embodiments of the disclosure.
Figure 14B:
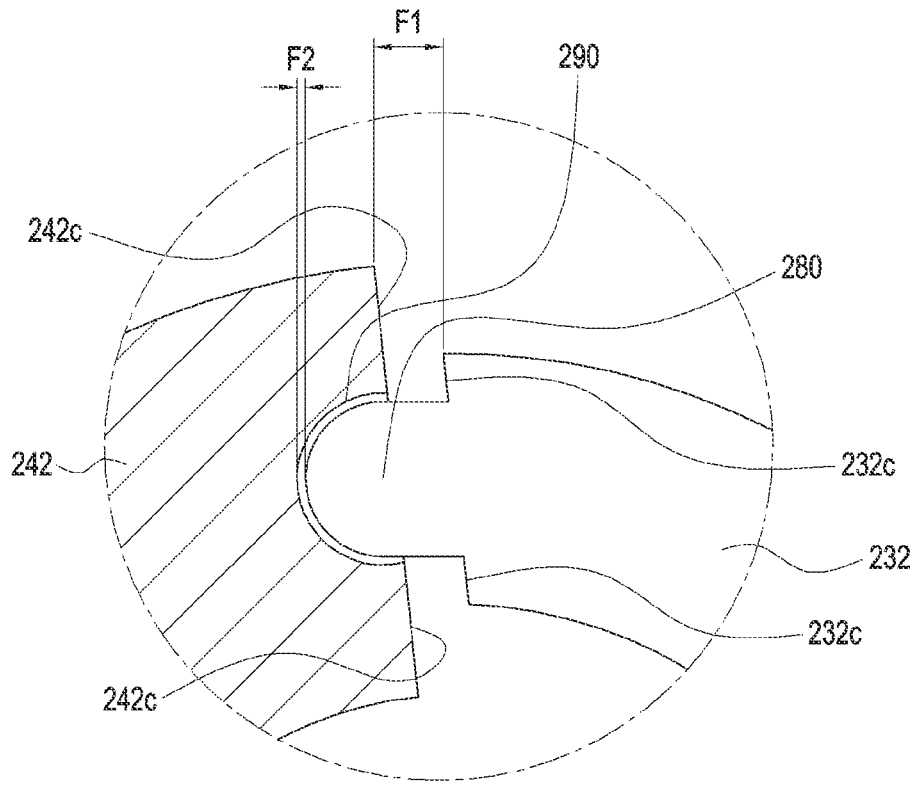
FIG. 14B is an enlarged side sectional view of portion E of FIG. 14A.

FIG. 14A is a side sectional view illustrating a state in which the wireless power receiving device 240 coupled to the external electronic device 220 and the wireless power transmitting device 230 coupled to the wireless charging device body 210 face each other, in the configuration of the wireless charging device 200 according to other various embodiments of the disclosure. FIG. 14B is an enlarged side sectional view of portion E of FIG. 14A.

Referring to FIGS. 14A and 14B, the reception surface 242c disposed in the main body 242a and the transmission surface 232c disposed in the main body 232a may face each other. The transmission surface 232c may include a coupling boss 280 coupled to a coupling recess 290 disposed on the reception surface 242c. For example, when the reception magnetic body 242 and the transmission magnetic body 232 face each other, the reception surface 242c and the transmission surface 232c face each other, and the coupling boss 280 of the transmission surface 232c may be inserted into and coupled to the coupling recess 290 of the reception surface 242c. The interval F2 between the coupling boss 280 and the coupling groove 290 may be disposed to be smaller than the interval F1 between the reception surface 242c and the transmission surface 232c. Further, similarly, because at least one electromagnetic field is formed only in the transmission magnetic body 232 and the reception magnetic body 242, an electromagnetic interference (EMI) that may be generated by the outside of the at least one transmission coil 231 and the at least one reception coil 241 can be further reduced.

Accordingly, because the interval F2 between the coupling boss 280 and the coupling recess 290 is disposed to be smaller than the interval F1 between the reception surface 242c and the transmission surface 232c, the transmission magnetic body 232 can generate at least one electromagnetic field A1 in an improved fashion such that electric power is induced in the at least one reception coil 241 when a current is applied to the at least one transmission coil 231.

According to an embodiment, the reception magnetic body 242 and the transmission magnetic body 232 may be divided into a plurality of parts along the at least one reception coil 241 and the at least one transmission coil 231. For example, the reception magnetic body 242 and the transmission magnetic body 232 are divided into a plurality of parts along the circumferences of the at least one reception coil 241 and the at least one transmission coil 231 such that the weights of the reception magnetic body 242 and the transmission magnetic body 232 can be reduced and the manufacturing costs of the reception magnetic body 242 and the transmission magnetic body 232 can be reduced. The at least one reception coil 241 and the at least one transmission coil 231 may be extracted to spaces defined between the divided reception magnetic bodies 242 and the divided transmission magnetic bodies 232. For example, a current input unit and a current output unit of the spaces defined by the at least one reception coil 241 and the at least one transmission coil 231 may be easily extracted through the spaces between the reception magnetic bodies 242 and the reception magnetic bodies 232.

Figure 15:
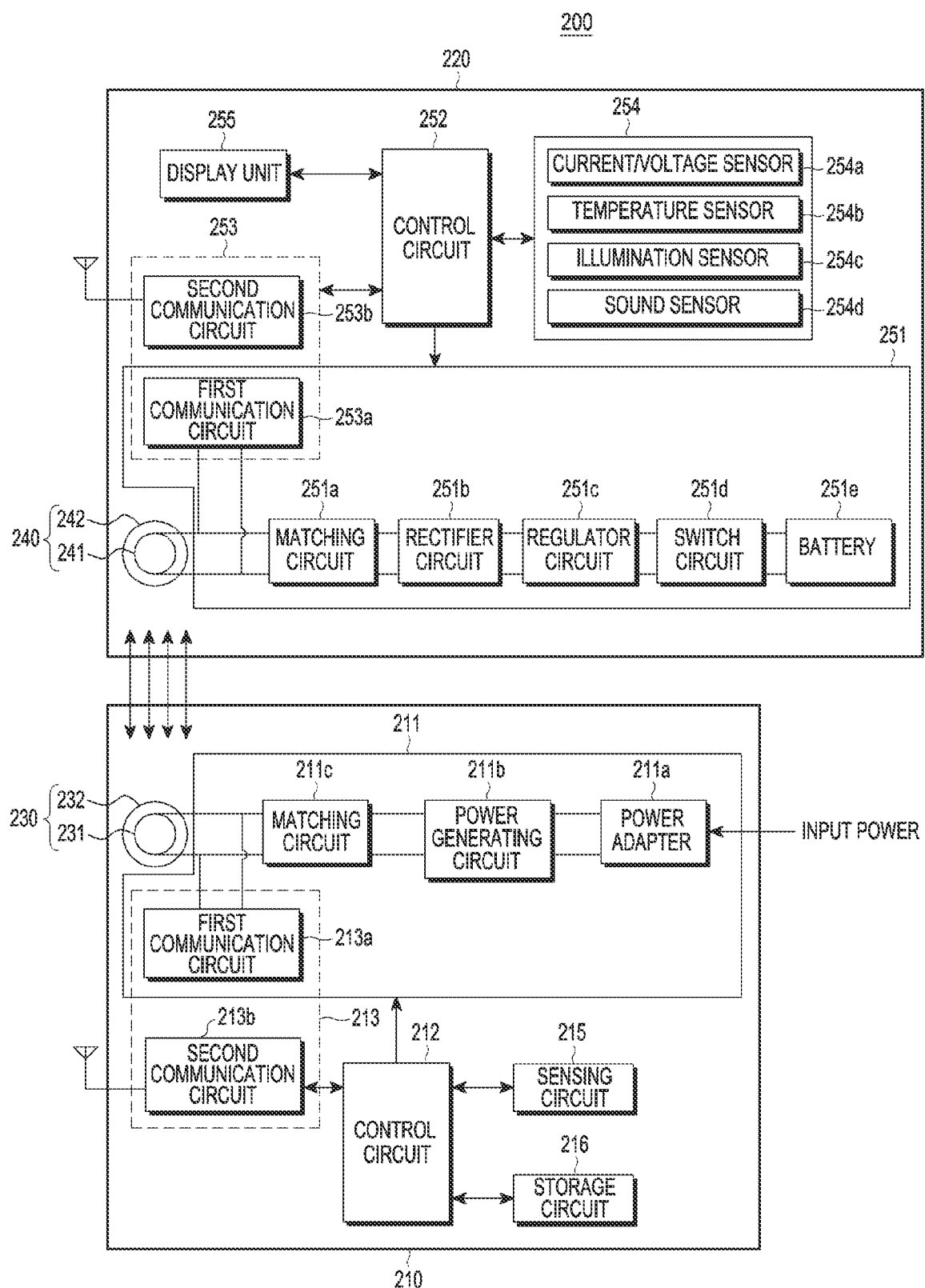

FIG. 15 is a block diagram of the wireless charging device 200 according to various embodiments of the disclosure.

Referring to FIG. 15, the wireless charging device 200 according to an embodiment of the disclosure may include a wireless power transmitting device 230 including at least one transmission coil 231 and a transmission magnetic body 232, and a wireless charging device body 210. The wireless charging device body 210 may include a part or a whole part of the wireless charging device body 210 illustrated in FIG. 15.

The wireless charging device body 210 according to an embodiment of the disclosure may include a power transmission circuit 211, a control circuit 212, a communication circuit 213, a sensing circuit 215, and a storage circuit 216. The external electronic device 220 may include a power reception circuit 251, a control circuit 252, a communication circuit 253, a sensing circuit 254, a display unit 255.

The power transmission circuit 211 may provide electric power required by the external electronic device 220, which is to receive electric power. The power transmission circuit 211 may be configured to wirelessly transmit electric power to the external electronic device 220 through at least one transmission coil 231 of the wireless power transmitting device 230. The power transmission circuit 211 may be supplied with electric power in DC or AC waveforms from the outside, and the supplied electric power may be supplied to the external electronic device 220 in AC waveforms. For example, when the power transmission circuit 211 may be supplied with electric power in DC waveforms from the outside, the electric power in the DC waveforms may be converted electric power in AC waveforms by using an inverter and may be supplied to the external electronic device 220 in AC waveforms. The power transmission circuit 211 is not limited thereto, and may include all means capable of providing electric power in predetermined AC waveforms without limitation.

In addition, the power transmission circuit 211 may provide AC waveforms to the electronic device 220 in the form of electromagnetic waves. A predetermined electromagnetic field generated by applying a current to the at least one transmission coil 231 of the wireless power transmitting device 230 may be transmitted or received by using an electromagnetic induction scheme or a resonance scheme. The power transmission circuit 211 may further include a first communication circuit 213a (e.g., a resonance circuit), and may perform communication (e.g., data communication) in an in-band form by using electromagnetic waves generated by the at least one transmission coil 231. The first communication circuit 213a will be described in more detail in the communication circuit 213, which will be described below. When the power transmission circuit 211 is implemented by a resonance circuit, the inductance L of the loop coil (not illustrated) of the resonance circuit may be changed.

The power transmission circuit 211 may be implemented in the form of an embedded battery, or may be implemented in the form of a power reception interface to receive power from the outside and supply the power to other elements.

The power transmission circuit 211, for example, may further include a power adapter 211a, a power generating circuit 211b, and a matching circuit 211c.

The power adapter 211a may receive AC or DC power from the outside, and may receive a power signal of the battery device and output the power signal as DC power having a preset voltage value. The voltage value of the DC power output from the power adaptor 211a may be controlled by the control circuit 212. The DC power output from the power adapter 211a may be output to the power generating circuit 211b.

The power generating circuit 211b may convert the DC current input from the power adaptor 211a into an AC current and may output the AC current. The power generating circuit 211b may also include an amplifier (not illustrated), and when the DC current input through the power adaptor 211a is less than a preset gain, the power generating circuit 211b may amplify the DC current to the preset gain using the amplifier. Also, the power generating circuit 211b may further include a circuit that converts a DC current, which is input from the power adapter 211a, to an AC current, based on a control signal input from the control circuit 212. For example, the power generating circuit 211b may convert the DC current to an AC current through a predetermined inverter. Further, the power generating circuit 211b may further include a gate driving device (not illustrated), and the gate driving device switches on and off the DC current and changes the DC current to an AC current while controlling the DC current. Further, the power generating circuit 211b may generate an AC power signal through a wireless power generator (e.g., an oscillator). Accordingly, the power generating circuit 211b may output the AC power.

The matching circuit 211c may perform impedance matching. For example, if the AC signal output from the power generating circuit 211b is transmitted to the at least one transmission coil 231 of the wireless power transmitting device 230, an electromagnetic field (e.g., the electromagnetic field A1 of FIG. 9) may be formed in the at least one transmission coil 231 by the AC signal. The matching circuit 211c may regulate the frequency band of the signal of the formed magnetic field (e.g., the magnetic field A1 of FIG. 9) and thus may regulate the impedance viewed from the matching circuit 211c. The matching circuit 211c may regulate the impedance transmitted to the external electronic device 220 through the at least one transmission coil 231, for example, viewed from the matching circuit 211c, through the impedance regulation, and thus may control the output power such that the output power is highly efficient or a high output. The matching circuit 211c may regulate impedance based on the control of the control circuit 212. The matching circuit 211c may include at least one of an inductor (e.g., a coil), a capacitor, and a switch device. The control circuit 212 may control the connection state with at least one of the inductor and the capacitor through the switch device and may perform impedance matching accordingly.

It will be easily understood by an ordinary person in the art that the power transmission circuit 211 is not limited thereto and includes all means capable of transmitting and receiving an electromagnetic field (e.g., the magnetic field A1 of FIG. 9).

The sensing circuit 215 may sense a change in a current/voltage applied to the at least one transmission coil 231 of the wireless power transmitting device 230. The wireless charging device body 210 may generate an amount of power, which is to be transmitted to the external electronic device 220, in response to the magnitude of the current/voltage applied to the at least one transmission coil 231. That is, the wireless charging device body 210 may change the amount of power, which is to be transmitted, according to the change in the current/voltage applied to the at least one transmission coil 231. For example, as the magnitude of the current/voltage applied to the at least one transmission coil 231 increases, the amount of power, which is to be transmitted, increases, and as the magnitude of the current/voltage applied to the at least one transmission coil 231 decreases, the amount of power, which is to be transmitted, decreases. Also, the sensing circuit 215 may sense a change in the temperature of the wireless charging device body 210. The sensing circuit 215 may generate electric power, which is to be transmitted to the power transmission circuit 211, or may sense a change in temperature due to heat, which may be generated in the wireless charging device body 210, when the generated electric power is transmitted to the external electronic device 220. For example, the sensing circuit 215 may measure at least one of the internal temperature and the external temperature of the wireless charging device body 210. According to an embodiment, the sensing circuit 215 may include at least one of a current/voltage sensor and a temperature sensor.

The control circuit 212 may control an overall operation of the wireless charging device body 210. The control circuit 212 may control an overall operation of the wireless charging device body 210 by using an algorithm, a program, or an application required for control, which is stored in the storage circuit 216. Further, the control circuit 212 may perform a control such that electric power is wirelessly transmitted to the external electronic device 220 through the power transmission circuit 211. The control circuit 212 may perform a control such that information is wirelessly received from the external electronic device 220 through the communication circuit 213.

The communication circuit (the first communication circuit 213a or the second communication circuit 213b) (e.g., the communication interface 170 or the communication module 220) may perform communication with the external electronic device 220 in a predetermined scheme. The communication circuit 213 may perform data communication with the communication circuit 253 of the external electronic device 220.

Meanwhile, the communication circuit 213 may transmit a signal on the information of the wireless charging device body 210 to the external electronic device 220. Here, the communication circuit 213 may unicast, multicast, or broadcast the signal. Also, the communication circuit 213 may transmit a charging function control signal for controlling a charging function of the external electronic device 220. The charging function control signal may be a control signal for enabling or disabling the charging function by controlling a specific electronic device (e.g., the power reception circuit 251 of the external electronic device 220).

Meanwhile, the communication circuit 213 may receive or transmit a signal from or to another wireless power transmitting device 230, as well as from or to the external electronic device 220.

The communication circuit 213 according to an embodiment of the disclosure, for example, may include at least one of a first communication circuit 213a implemented in a piece of hardware with the power transmission circuit 211 such that the wireless charging device body 210 performs communication in an in-band form and a second communication circuit 213b implemented in a different piece of hardware from the power transmission circuit 211 such that the wireless charging device body 210 performs communication in an out-of-band form.

For example, when the communication circuit 213 includes the first communication circuit 213a that may perform communication in an in-band form, the first communication circuit 213a may receive the frequency and the signal level of the electromagnetic field (e.g., the electromagnetic field A1 of FIG. 9) signal received through the at least one transmission coil 231 of the wireless power transmitting device 230. The control circuit 212 may decode the frequency and the signal level of the received signal of the electromagnetic field (e.g., the electromagnetic field A1 of FIG. 9) and thus may extract information received from the external electronic device 220. Further, the first communication circuit 213a may apply a signal on the information of the wireless charging device body 210, which is to be transmitted to the external electronic device 220, to the at least one transmission coil 231 of the wireless power transmitting device 230, or may add a signal on the information of the wireless charging device body 210 to a signal of the electromagnetic field (e.g., the electromagnetic field A1 of FIG. 9) generated when a signal output from the matching circuit 211c is applied to the at least one transmission coil 231 and transmit the signal of the electromagnetic field, to which the signal on the information of the wireless charging device body 210 is added, to the external electronic device 220. The control circuit 212 may perform a control such that a connection state with at least one of the inductor and the capacitor of the matching circuit 211c is changed and output, through an on/off control of the switch device included in the matching circuit 211c.

For example, when the communication circuit 213 includes the second communication circuit 213b that may perform communication in an out-of-band form, the second communication circuit 213b may perform communication with the communication circuit 253 (e.g., the second communication circuit 253b) of the external electronic device 220 by using a near field communication (NFC), ZigBee communication, infrared ray communication, visual ray communication, Bluetooth communication, and Bluetooth low energy (BLE) communication.

The above-described communication scheme of the communication circuit 213 is simply illustrative, and the embodiments of the disclosure correspond to a specific communication scheme performed by the communication circuit 213, and the scope of the disclosure is not limited thereto.

Further, the communication circuit 213 may transmit a charging function control signal for controlling a charging function of the external electronic device 220. The charging function control signal may be a control signal for enabling or disabling the charging function by controlling the power receiver 251 of the specific electronic device 220.

Meanwhile, the communication circuit 213 may receive a signal from another wireless power transmitting device 230, as well as from the external electronic device 220. Although it is illustrated in FIG. 15 that the communication circuit 213 is configured with hardware different from the power transmission circuit 211 so that the wireless charging device 210 performs communication in an out-of-band format, this is illustrative. According to the disclosure, the wireless power transmitting device 230, the power transmission circuit 211, and the communication circuit 213 are implemented in one piece of hardware, and thus the wireless charging device body 210 may perform communication in an in-band form.

The wireless charging device body 210 and the external electronic device 220 may transmit and receive various signals through the communication circuits 213 and 253, respectively.

Further, according to various embodiments of the disclosure, the wireless charging device body 210 may be an electronic device including the power transmission circuit 211. Accordingly, the wireless charging device body 210 may transmit electric power to the battery of the external electronic device 220 as wireless power. Further, according to various embodiments of the disclosure, the wireless charging device body 210 is not limited to a station, a charging pad, a wireless charger, or a portable terminal, and may be various electronic devices including the power transmission circuit 211.

Meanwhile, the power reception circuit 251 of the external electronic device 220 according to an embodiment of the disclosure may receive electric power from the wireless power transmission circuit 211 of the wireless charging device body 210. The power reception circuit 251 may be implemented in the form of an embedded battery or may be implemented in the form of a power reception interface to receive power from the outside. The wireless power receiving device 240 may include at least one reception coil 241 and a reception magnetic body 242. The wireless power receiving device 240 may receive wireless power in the form of an electromagnetic wave in response to the current/voltage applied to the at least one transmission coil 231 of the wireless power transmitting device 230 through the at least one reception coil 241. For example, the wireless power receiving device 240 may receive electric power that is supplied to at least one reception coil 241 of the adjacent wireless power receiving device 240 after the electric power in AC waveforms applied to the at least one transmission coil 231 of the wireless power transmitting device 230 generates an induced electromotive force.

The power reception circuit 251, for example, may further include a matching circuit 251a, a rectifier circuit 251b, a regulator circuit 251c, a switch circuit 251d, and a battery 251e.

The matching circuit 251a may perform impedance matching. For example, if electric power is applied to the at least one transmission coil 231 of the wireless power transmitting device 230, the transmission magnetic body 232 may form at least one electromagnetic field (e.g., the magnetic field A1 of FIG. 9) such that electric power is induced in the at least one reception coil 241. The matching circuit 251a may regulate the frequency band of the signal of the formed magnetic field (e.g., the magnetic field A1 of FIG. 9) and thus may regulate the impedance viewed from the matching circuit 251a. The matching circuit 251a may perform a control such that input power received from the wireless charging device body 210 through the at least one reception coil 241 is highly efficient and a high output, through the impedance regulation. The matching circuit 251a may regulate impedance based on the control of the control circuit 252. The matching circuit 251a may include at least one of an inductor (e.g., a coil), a capacitor, and a switch device. The control circuit 252 may control the connection state with at least one of the inductor and the capacitor through the switch device, and may perform impedance matching accordingly.

The rectifier circuit 251b may rectify the wireless power received by the at least one reception coil 241 in an AC form, and for example, may be implemented in the form of a bride diode.

The regulator circuit 251c may convert the rectified power into a preset gain. The regulator circuit 251c may include a DC/DC convertor (not illustrated). For example, the regulator circuit 251c may convert the rectified power such that the output terminal thereof has a voltage of 5 V. Meanwhile, the minimum and maximum values of an applicable voltage may be set in advance at the front end of the regulator circuit 251c.

The switch circuit 251d may connect the regulator circuit 251c and the battery 251e. The switch circuit 251d may be maintained in an on/off state under the control of the control circuit 252.

The battery 251e may be supplied with the power input from the regulator circuit 251c for charging when the switch circuit 251d is in an on state.

The sensing circuit 254 may sense a change in the charging state of the electric power received by the external electronic device 220. For example, the sensing circuit 254 may periodically or non-periodically measure the current/voltage value received by the at least one reception coil 241, through a predetermined current/voltage sensor 254a. The external electronic device 220 may calculate the amount of electric power, which is received by the external electronic device 220, based on the measured current/voltage.

The sensing circuit 254 may sense a change in the charging environment of the external electronic device 220. For example, the sensing circuit 254 may periodically or non-periodically measure at least one of the internal temperature and the external temperature of the external electronic device 220, through a predetermined temperature sensor 254b. The sensing circuit 254 may periodically or non-periodically measure the intensity of illumination (brightness) of the surroundings of the external electronic device 220, through a predetermined illumination sensor 254c. The sensing circuit 252 may periodically or non-periodically measure the sound (noise) level of the surroundings of the external electronic device 220, through a predetermined sound sensor 254d.

Figure 16:
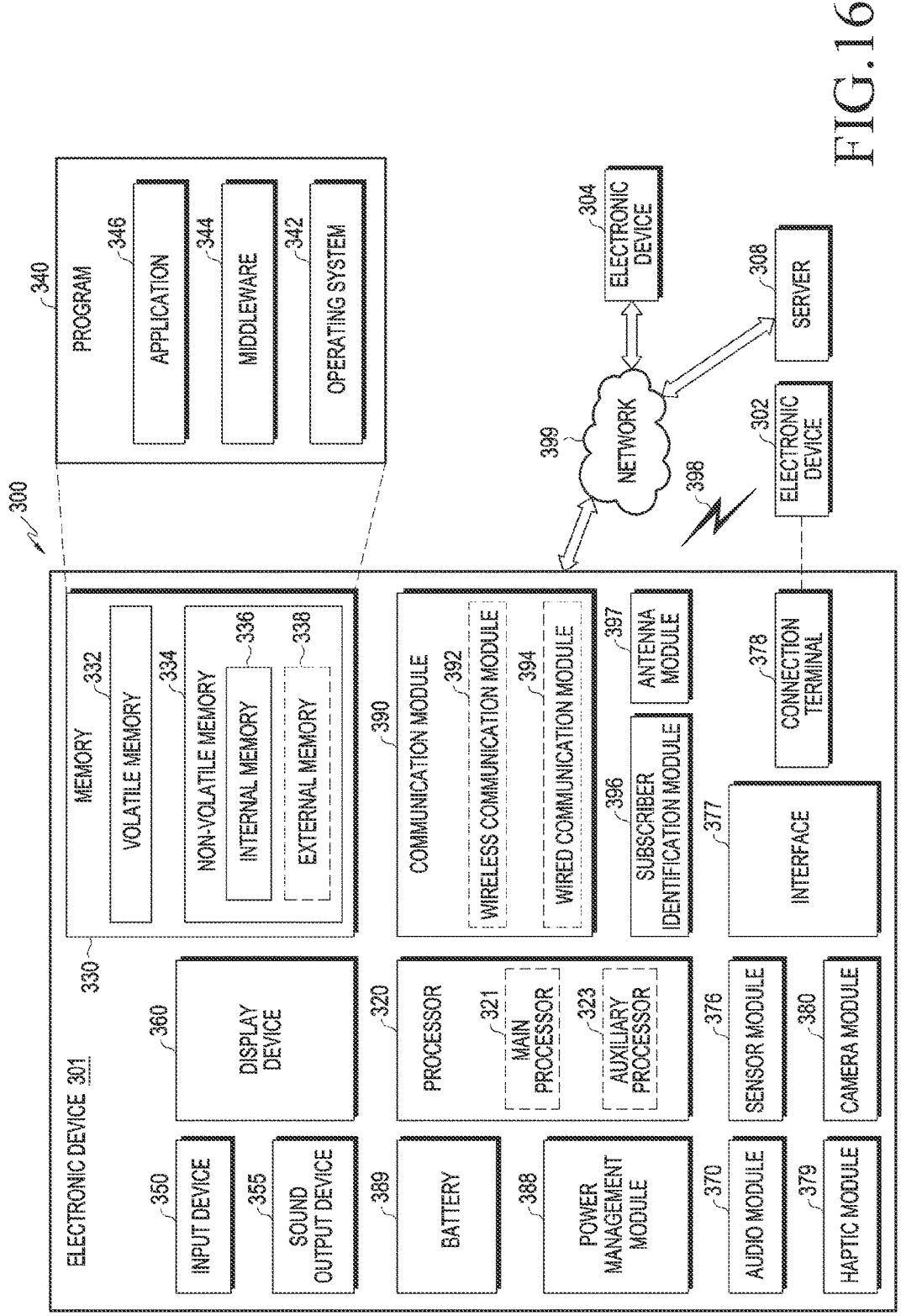
FIG. 16 is a block diagram illustrating an electronic device in a network environment according to various embodiments.

FIG. 16 is a block diagram illustrating an electronic device 301 in a network environment 300 according to various embodiments.

Referring to FIG. 16, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, a keyboard, or a digital pen (e.g., a stylus pen).

The sound output device 355 may output sound signals to the outside of the electronic device 301. The sound output device 355 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to an embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to an embodiment, the audio module 370 may obtain the sound via the input device 350, or output the sound via the sound output device 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his or her tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB). According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

The electronic device 301 according to various embodiments of the disclosure may be devices in various forms. The electronic device 301, for example, may include a robot device, a robot cleaner, a portable communication device (e.g., a smartphone), a speaker device, an AI speaker device, an AI electronic device, a computer device, a portable multimedia device, a portable medical device, a camera, a wearable device, an electric appliance, a station, or a charging pad. According to an embodiment, the electronic devices are not limited to those described above.

According to various embodiments of the disclosure, a wireless charging device (e.g., the wireless charging device 200 of FIG. 1) includes a wireless power transmitting device embedded in a wireless charging device body and arranged to face a wireless power receiving device provided in an external electronic device, the wireless power transmitting device including at least one transmission coil, and a transmission magnetic body surrounding the at least one transmission coil and facing a reception magnetic body provided in the wireless power receiving device, wherein the wireless power transmitting device has a ring shape, wherein the outer circumferential surface of the ring shape of the wireless power receiving device faces the inner surface of the external electronic device, wherein the inner circumferential surface of the ring shape of the wireless power transmitting device faces the inner surface of the wireless charging device body, wherein when the wireless charging device body and the external electronic device are coupled to each other, the outer circumferential surface of the ring shape of the wireless power receiving device and the inner circumferential surface of the ring shape of the wireless power transmitting device face each other, wherein the reception magnetic body and the transmission magnetic body have ring structures, at least a portion of which is opened, when viewed in a side section cut vertically, wherein one surface of the opened ring structure of the reception magnetic body is arranged at at least a portion of the inner external shape of the external electronic device, wherein one surface of the opened ring structure of the transmission magnetic body is arranged at at least a portion of the inner external shape of the wireless charging device body, and wherein the transmission magnetic body generates at least one electric field such that electric power is induced in the at least one reception coil provided in the wireless power receiving device when a current is applied to the at least one transmission coil in a state in which one surface of the opened ring structure of the reception magnetic body and one surface of the opened ring structure of the transmission magnetic body face each other.

According to various embodiments of the disclosure, the at least one electromagnetic field may be formed along the ring structure of the reception magnetic body and the ring structure of the transmission magnetic body.

According to various embodiments of the disclosure, the shapes of the ring structures of the reception magnetic body and the transmission magnetic body may include at least one of a triangular shape, a tetragonal shape, a rhombus shape, a horseshoe shape, a U shape, and a laid-U shape.

According to various embodiments of the disclosure, the external electronic device may include at least one of a robot device, a robot cleaner, a wearable device, a speaker device, an artificial intelligence (AI) electronic device, a portable communication device, or a smartphone.

According to various embodiments of the disclosure, the wireless charging device may include at least one of a station or a charging pad.

According to various embodiments of the disclosure, the wireless power receiving device may be arranged between the outer circumferential surface of the external electronic device and the central axis of the external electronic device.

According to various embodiments of the disclosure, the wireless power receiving device and the wireless power transmitting device may be arranged parallel or perpendicular to the central axis of the external electronic device.

According to various embodiments of the disclosure, the reception magnetic body may include a main body (e.g., the main body 242a of FIG. 8) having a ring shape, a portion of which is opened, a seating space (e.g., the seating space 242b of FIG. 8) disposed inside the main body of the reception magnetic body, and in which the at least one reception coil is seated while the at least one reception coil is surrounded by the seating space, and a reception surface (e.g., the reception surface 242c of FIG. 8) disposed in the main body of the reception magnetic body and facing a transmission surface disposed in a main body of the transmission magnetic body.

According to various embodiments of the disclosure, the transmission magnetic body may include a main body (e.g., the main body 232a of FIG. 8) having a ring shape, a portion of which is opened, a seating space (e.g., the seating space 232b of FIG. 8) disposed inside the main body of the transmission magnetic body, and in which the at least one reception coil is seated while the at least one transmission coil is surrounded by the seating space, and a transmission surface (e.g., the reception surface 232c of FIG. 8) disposed in the main body of the transmission magnetic body and facing a reception surface disposed in a main body of the reception magnetic body.

According to various embodiments of the disclosure, a predetermined distance (e.g., an aperture for electromagnetic waves) may be provided between the reception surface and the transmission surface.

According to various embodiments of the disclosure, the reception surface may further include a coupling boss (e.g., the coupling boss 260 of FIGS. 13A and 13B) coupled to a coupling recess (e.g., the coupling recess 270 of FIGS. 13A and 13B) disposed on the transmission surface.

According to various embodiments of the disclosure, the interval (e.g., the interval L2 of FIG. 13B) between the coupling boss (e.g., the coupling boss 260 of FIGS. 13A and 13B) of the reception surface and the coupling recess (e.g., the coupling recess 270 of FIGS. 13A and 13B) of the transmission surface may be smaller than the interval (e.g., the interval L1 of FIG. 13B) between the reception surface and the transmission surface.

According to various embodiments of the disclosure, the transmission surface may further include a coupling boss (e.g., the coupling boss 280 of FIGS. 14A and 14B) coupled to a coupling recess (e.g., the coupling recess 290 of FIGS. 14A and 14B) disposed on the reception surface.

According to various embodiments of the disclosure, the interval (e.g., the interval F2 of FIG. 14B) between the coupling boss (e.g., the coupling boss 280 of FIGS. 14A and 14B) of the transmission surface and the coupling recess (e.g., the coupling recess 290 of FIGS. 14A and 14B) of the reception surface may be smaller than the interval (e.g., the interval F1 of FIG. 14B) between the reception surface and the transmission surface.

According to various embodiments of the disclosure, the reception magnetic body and the transmission magnetic body are divided into a plurality of parts along at least one reception coil and the at least one transmission coil.

According to various embodiments of the disclosure, a wireless charging device includes a wireless power transmitting device embedded in a wireless charging device body and arranged to face a wireless power receiving device provided in an external electronic device, the wireless power transmitting device including at least one transmission coil, and a transmission magnetic body surrounding the at least one transmission coil and facing a reception magnetic body provided in the wireless power receiving device, wherein the transmission magnetic body generates at least one electric field such that electric power is induced in the at least one reception coil provided in the wireless power receiving device when a current is applied to the at least one transmission coil in a state.

According to various embodiments of the disclosure, the reception magnetic body and the transmission magnetic body have ring structures, at least a portion of which is opened, when viewed in a side section cut vertically, one surface of the opened ring structure of the reception magnetic body is arranged at at least a portion of the inner external shape of the external electronic device, and one surface of the opened ring structure of the transmission magnetic body is arranged at at least a portion of the inner external shape of the wireless charging device body.

According to various embodiments of the disclosure, an electronic device includes a wireless power receiving device embedded in an external electronic device and arranged to face a wireless power transmitting device provided in a wireless charging device body, the wireless power receiving device including at least one reception coil, and a reception magnetic body surrounding the at least one reception coil and facing a transmission magnetic body provided in the wireless power transmitting device, wherein the wireless power receiving device has a ring shape, wherein the outer circumferential surface of the ring shape of the wireless power receiving device faces the inner surface of the external electronic device, wherein the inner circumferential surface of the ring shape of the wireless power transmitting device faces the inner surface of the wireless charging device body, wherein when the external electronic device and the wireless charging device body are coupled to each other, the outer circumferential surface of the ring shape of the wireless power receiving device and the inner circumferential surface of the ring shape of the wireless power transmitting device face each other, wherein the reception magnetic body has a ring structure, at least a portion of which is opened, when viewed in a side section cut vertically, and wherein one surface of the opened ring structure of the reception magnetic body is arranged at at least a portion of the inner external shape of the external electronic device.

It is noted by those skilled in the art to which the disclosure pertains that the wireless charging devices that wirelessly transmit electric power according to various embodiments of the disclosure, which have been described above, are not limited by the above-mentioned embodiments and the drawings, but may be variously replaced, modified, and changed without departing from the scope of the disclosure.

What is claimed is:

1. A wireless charging device comprising:
   a wireless charging device body; and
   a wireless power transmitter disposed in the wireless charging device body to face a wireless power receiver provided in an external electronic device when the external electronic device is coupled to the wireless charging device body,
   wherein the wireless power transmitter comprises:
      at least one transmission coil having a ring shape; and
      a transmission magnetic body surrounding the at least one transmission coil and disposed in the wireless charging device body so as to face a reception magnetic body provided in the wireless power receiver when the external electronic device is coupled to the wireless charging device body,
   wherein an inner circumferential surface of the wireless power transmitter faces an inner surface of the wireless charging device body, wherein, when the external electronic device is coupled to the wireless charging device body, an outer circumferential surface of the wireless power receiver and the inner circumferential surface of the wireless power transmitter face each other, wherein the transmission magnetic body has a toroidal structure which has a U shape or horseshoe shape cross section perpendicular to a direction in which the at least one transmission coil is extended, and includes a first opened side corresponding to a second opened side of the reception magnetic body which has a toroidal structure, and wherein the transmission magnetic body is configured such that the first opened side and the second opened side face each other when the external electronic device coupled to the wireless charging device body, and wherein a current is applied to the transmission coil when the external electronic device is coupled to the wireless charging device body and generates an electromagnetic field for inducing electric power in a reception coil.

2. The wireless charging device of claim 1, wherein the electromagnetic field is formed along the transmission magnetic body.

3. The wireless charging device of claim 1, wherein the external electronic device comprises at least one of a robot device, a robot cleaner, a wearable device, a speaker device, an artificial intelligence (AI) electronic device, a portable communication device, or a smartphone.

4. The wireless charging device of claim 1, wherein the wireless charging device comprises at least one of a station or a charging pad.

5. The wireless charging device of claim 1, wherein the transmission magnetic body comprises:
a main body having a ring shape, at least a portion of which is open; and
a seating space disposed inside the main body of the transmission magnetic body and in which the at least one transmission coil is seated, wherein
a transmission surface is formed on the main body of the transmission magnetic body to face a reception surface of the wireless power receiver when the external electronic device is coupled to the wireless charging device body.

6. The wireless charging device of claim 5, wherein the reception surface and the transmission surface are spaced by a predetermined distance when the external electronic device is coupled to the wireless charging device body.

7. The wireless charging device of claim 5, wherein the transmission surface comprises a coupling boss to couple the reception surface.

8. The wireless charging device of claim 5, wherein the transmission magnetic body is divided into a plurality of parts along the at least one transmission coil.

9. An electronic device comprising:
an electronic device body;
a wireless power receiver disposed in the electronic device body so as to face a wireless power transmitter provided in a wireless charging device body when a wireless charging device is coupled to the electronic device body, wherein the wireless power receiver comprises:
at least one reception coil; and
a reception magnetic body surrounding the at least one reception coil to face a transmission magnetic body provided in the wireless power transmitter when the wireless charging device is coupled to the electronic device body, wherein an outer circumferential surface of the wireless power receiver faces an inner surface of the electronic device body, wherein, when the wireless charging device is coupled to the electronic device body, the outer circumferential surface of the wireless power receiver and an inner circumferential surface of the wireless charging device face each other and wherein the reception magnetic body has a ring-toroidal structure which has a U shape or a horseshoe shape cross section, perpendicular to at least one transmission coil, with an opened side corresponding to an opened side of the transmission magnetic body which has a toroidal structure, configured such that the opened sides face each other when the electronic device body is coupled to the wireless charging device, wherein the reception magnetic body has a toroidal structure which has a U shape or horseshoe shape cross section perpendicular to a direction in which the at least one transmission coil is extended, and includes a first opened side corresponding to a second opened side of the transmission magnetic body which has a toroidal structure, and wherein the reception magnetic body is configured such that the first opened side and the second opened sides face each other when the electronic device body is coupled to the wireless charging device body.

10. The electronic device of claim 9, wherein the reception magnetic body comprises:
a main body having a ring shape, at least a portion of which is open; and
a seating space disposed inside the main body of the reception magnetic body and in which the at least one reception coil is seated, wherein
a reception surface is formed on the main body of the reception magnetic body and faces a transmission surface of the wireless charging device when the wireless charging device is coupled to the electronic device body.

11. The electronic device of claim 10, wherein the reception surface comprises a coupling boss to couple a transmission magnetic body of the wireless charging device.

12. The electronic device of claim 9, wherein the wireless power receiver has a ring shape.

13. The electronic device of claim 9, wherein the reception magnetic body is divided into a plurality of parts along the at least one reception coil.

\* \* \* \* \*